United States Patent
Öztireli et al.

(10) Patent No.: US 10,325,346 B2
(45) Date of Patent: Jun. 18, 2019

(54) IMAGE PROCESSING SYSTEM FOR DOWNSCALING IMAGES USING PERCEPTUAL DOWNSCALING METHOD

(71) Applicant: ETH-Zurich, Zürich (CH)

(72) Inventors: Ahmet Cengiz Öztireli, Zurich (CH); Markus Gross, Zurich (CH)

(73) Assignee: ETH-Zurich, Zürich (CH)

( * ) Notice: Subject to any disclaimer, the term of this patent is extended or adjusted under 35 U.S.C. 154(b) by 0 days.

(21) Appl. No.: 15/218,666

(22) Filed: Jul. 25, 2016

(65) Prior Publication Data

US 2017/0024852 A1 Jan. 26, 2017

Related U.S. Application Data

(60) Provisional application No. 62/196,640, filed on Jul. 24, 2015.

(51) Int. Cl.
*G06K 9/62* (2006.01)
*G06T 3/40* (2006.01)
(Continued)

(52) U.S. Cl.
CPC ............... *G06T 3/40* (2013.01); *G06K 9/6215* (2013.01); *G06T 3/0012* (2013.01); *G06T 5/002* (2013.01); *G06T 5/50* (2013.01)

(58) Field of Classification Search
CPC .. G06T 3/40; G06T 5/002; G06T 5/50; G06T 3/0012; G06K 9/6215; G06K 9/00194
See application file for complete search history.

(56) References Cited

U.S. PATENT DOCUMENTS

| 8,538,201 B2 * | 9/2013 | Damkat | G06T 3/4053 382/299 |
| 2006/0139379 A1 * | 6/2006 | Toma | G06T 3/40 345/698 |

(Continued)

FOREIGN PATENT DOCUMENTS

| WO | 2011160225 A1 | 12/2011 |
| WO | 2013079516 A1 | 6/2013 |

(Continued)

OTHER PUBLICATIONS

Banterle et al., "Multidimensional image retargeting," Proceedings of SIFFRAPH Asia 2011 Courses, 2011:853-856.
(Continued)

*Primary Examiner* — Shaghayegh Azima
(74) *Attorney, Agent, or Firm* — Davis Wright Tremaine LLP; Philip H. Albert

(57) ABSTRACT

An image processor inputs a first image and outputs a downscaled second image by upscaling the second image to a third image, wherein the third image is substantially the same size as the first image size with a third resolution, associating pixels in the second image with a corresponding group of pixels from the third set of pixels, sampling a first image area at a first location of the first set of pixels to generate a first image sample, sampling a second image area of the third set of pixels to generate a second image sample, measuring similarity between the image areas, generating a perceptual image value, recursively adjusting values of third set of pixels until the image perception value matches a perceptual standard value, and adjusting pixel values in the second image to a representative pixel value of each of the corresponding group of pixels.

4 Claims, 14 Drawing Sheets

(51) Int. Cl.
    G06T 5/00    (2006.01)
    G06T 5/50    (2006.01)
    G06T 3/00    (2006.01)

(56) References Cited

U.S. PATENT DOCUMENTS

| | | | | |
|---|---|---|---|---|
| 2011/0216975 A1* | 9/2011 | Rother | G06K 9/34 | 382/173 |
| 2011/0242126 A1* | 10/2011 | Hoppe | G06T 5/50 | 345/589 |
| 2011/0243438 A1* | 10/2011 | Hoppe | G06T 3/4007 | 382/167 |
| 2011/0317773 A1* | 12/2011 | Lancaster | G06T 3/40 | 375/240.27 |
| 2014/0328546 A1* | 11/2014 | Kourousias | G06T 3/40 | 382/239 |
| 2015/0093015 A1* | 4/2015 | Liang | G06T 3/4076 | 382/154 |
| 2015/0110414 A1* | 4/2015 | Cho | G06T 5/005 | 382/254 |
| 2016/0080653 A1* | 3/2016 | Kim | G06T 5/002 | 348/216.1 |

FOREIGN PATENT DOCUMENTS

| | | | | |
|---|---|---|---|---|
| WO | WO 2013079516 A1 * | 6/2013 | | G06T 3/40 |
| WO | WO-2013079516 A1 * | 6/2013 | | G06T 3/40 |

OTHER PUBLICATIONS

Bonnier et al., "Evaluation of Spatial Gamut Mapping Algorithms," Proceedings of the 14th Color and Image Conference, 56-61, 2006.

Brunet et al., "On the Mathematical Properties of the Structural Similarity Index," IEEE Transactions on Image Processing, 21(4):1488-1499, Apr. 2012.

Brunet et al., "Structural Similarity-Based Approximation of Signals and Images Using Orthogonal Bases," International Conference on Image Analysis and Recognition, Jun. 2010, 12 pages.

Brunet, "A Study of the Structural Similarity Image Quality Measure with Applications to Image Processing," Doctoral Thesis, University of Waterloo, 225 pages, 2012.

Chai et al., "SSIM Performance Limitation of Linear Equalizers," 2014 IEEE Conference on Acoustic, Speech and Signal Processing, 1229-1233, May 4-9, 2014.

Channappayya et al., "A linear estimator optimized for the structural similarity index and its application to image denoising," 2006 IEEE International Conference on Image Processing 2637-2640, date of conference Oct. 8-11, 2006, date of publication Feb. 20, 2007.

Channappayya et al., "Design of linear equalizers optimized for the structural similarity index," IEEE Transactions on Image Processing 17(6):857-872, published online ahead of print Apr. 3, 2008, print publication Jun. 2008.

Channappayyya et al., "Rate bounds on SSIM index of quantized images," IEEE Transactions on Image Processing 17(9):1624-1639, published online ahead of print Aug. 12, 2008, print publication Sep. 2008.

Channappayya et al., "SSIM-optimal linear image restoration," 2008 IEEE International IEEE Conference on Acoustics, Speech and Signal Processing, 765-768, date of conference Mar. 31-Apr. 4, 2008, date of publication May 12, 2008.

Chen et al., "Gradient-based structural similarity for image quality assessment," 2006 IEEE International Conference on Image Processing 2929-2932, date of conference Oct. 8-11, 2006, published online Feb. 20, 2007.

Demirtas et al., "Full-reference quality estimation for images with difference spatial resolutions," IEEE Transactions on Image Processing 23(5):2069-2080, published online ahead of print Mar. 11, 2014, print publication May 2014.

Dong et al., "Adaptive downsampling for high-definition video coding," IEEE Transactions on Circuits and Systems for Video Technology 24(3):480-488, published online ahead of print Aug. 16, 2013, print publication Mar. 2014, first disclosed at ICIP 2012.

Gerstner et al., "Pixelated image abstraction," Proceedings of the 10th International Symposium on Non-photorealistic Animation and Rendering 29-36, date of conference Jun. 4-6, 2012.

He et al., "Objective image quality assessment: A survey," International Journal of Computer Mathematics, 91(11):2374-2388, accepted author version posted online Jun. 25, 2013, published online Jul. 30, 2013, print publication 2014.

International Search Report and Written Opinion dated Nov. 16, 2016, International Patent Application No. PCT/IB2016/054404, filed Jul. 23, 2016.

Kopf et al., "Content-adaptive image downscaling," ACM Transactions on Graphics, 32(6)173.1-173.8, Nov. 2013.

Krawczyk wt al., "Contrast restoration by adaptive countershading," Proceedings of Eurographics 26(3):581-590, Sep. 2007.

Lissner et al., "Image-difference prediction: From grayscale to color," IEEE Transactions on Image Processing, 22(2):435-446, published online ahead of print Sep. 19, 2012, print publication Feb. 2013.

Liu et al., "Learning to detect a salient object," IEEE Transactions on Pattern Analysis and Machine Intelligence, 33(2):353-367, published online ahead of print Mar. 18, 2010, print publication Feb. 2011.

Mitchell et al., "Reconstruction filters in computer-graphics,"ACM SIGGRAPH Computer Graphics 22(4):221-228, Aug. 1988.

Nehab et al., "Generalized sampling in computer graphics," Microsft TechReport MSR-TR-2011-16, Feb. 1, 2011.

Ogawa et al., "Image inpainting based on sparse representations with a perceptual metric," EURASIP Journal on Advances in Signal Processing 2013(179), 26 pages, Dec. 5, 2013.

Pang et al., "Structure-aware halftoning," ACM Transactions on Graphics, 27(3):89.1-89.8, Aug. 2008.

Polesel et al., "Adaptive unsharp masking for contrast enhancement," Proceedings of the International Conference on Image Processing, date of conference Oct. 26-29, 1997, published online Aug. 6, 2002.

Rehman et al., "SSIM-inspired image denoising using sparse representations," IEEE International Conference on Acoustics, Speech and Signal Processing 1121-1124, date of conference May 22-27, 2011, published online Jul. 12, 2011.

Ritschel et al., "3D Unsharp Masking for Scene Coherent Enhancement," ACM Transactions on Graphics (TOG)—Proceedings of ACM SIGGRAPH 2008 27(3), eight pages, Aug. 2008.

Shannon, "Communication in the presence of noise," Proceedings of the IEEE, 86(2):447-457, Feb. 1998, originally disclosed in Jan. 1949.

Shao et al., "Structural similarity-optimal total variation algorithm for image denoising," Foundations and Practical Applications of Cognitive Systems and Information Processing, 215:833-843, Sep. 22, 2013.

Silvestre-Blanes, "Structural similarity image quality reliability: Determining parameters and window size." Signal Processing, 91(4):1012-1020, Apr. 2011.

Smith et al., "Apparent greyscale: A simple and fast conversion to perceptually accurate images and video," Computer Graphics Forum 27(2):193-200, Apr. 2008.

Thévenaz et al., "Interpolation revisited," IEEE Transactions on Medical Imaging, 19(7):739-758, Jul. 2000.

Tomasi et al., "Bilateral filtering for gray and color images," Sixth International Conference on Computer Vision 839-846, date of conference Jan. 7, 1998, published online Aug. 6, 2002.

Trentacoste et al., "Blur-Aware Image Downsizing," Computer Graphics Forum 30(2):573-582, Apr. 2011.

Wang et al., "Image quality assessment: from error visibility to structural similarity," IEEE Transactions on Image Processing 13(4):600-612, Apr. 2004.

Wang et al., "Mean Squared Error: Love it or Leave It? A new look at signal fidelity measures," IEEE Signal Processing Magazine, 26(1):98-117, Jan. 2009.

(56) References Cited

OTHER PUBLICATIONS

Wang et al., "Rate-AAIM optimization for video coding," IEEE International Conference on Acoustics, Speech and Signal Processing 833-836, date of conference May 22-27, 2011, published online Jul. 12, 2011.

Wang et al., "Video quality assessment using a statistical model of human visual speed perception," Journal of the Optical Society of America 24(12):B61-B69, Dec. 1, 2007.

Wu et al., "Low bit-rate image compression via adaptive downsampling and constrained least squares upconversion," IEEE Transactions on Image Processing 18(3):552-561, Mar. 2009.

Yeganeh et al., "Cross Dynamic Range and Cross Resolution Objective Image Quality Assessment with Applications," PhD thesis, University of Waterloo, 2014.

Zhang et al., "A comprehensive evaluation of full reference image quality assessment algorithms," 19th IEEE International Conference on Image Processing, 1477-1480, date of conference Sep. 30-Oct. 3, 2012, published online Feb. 21, 2013.

Zhang et al., "Interpolation-dependent image downsampling," IEEE Transactions on Image Processing 20(11)3291-3296, published online ahead of print May 31, 2011, print publication Nov. 2011.

Zhou et al., "Single-frame image super-resolution inspired by perceptual criteria," IEEE Transactions on Image Processing, 9(1):1-11, Dec. 15, 2015.

\* cited by examiner

IMAGE PROCESSING SYSTEM FOR DOWNSCALING IMAGES USING PERCEPTUAL DOWNSCALING METHOD

CROSS-REFERENCES TO PRIORITY AND RELATED APPLICATIONS

This application claims priority from and is a non-provisional of U.S. Provisional Patent Application No. 62/196,640 filed Jul. 24, 2015 entitled "Perceptually Based Downscaling of Images". The entire disclosure of application recited above is hereby incorporated by reference, as if set forth in full in this document, for all purposes.

FIELD OF THE INVENTION

The present disclosure generally relates to image processing. The disclosure relates more particularly to apparatus and techniques for performing downscaling of images wherein an input image file is processed to generate a downscaled output image file.

BACKGROUND

Image downscaling is a fundamental operation performed constantly in digital imaging. The abundance of high resolution capture devices and the variety of displays with different resolutions make it an essential component of virtually any application involving images or video. However, this problem has so far received substantially less attention than other sampling alterations.

Classical downscaling algorithms aim at minimizing aliasing artifacts by linearly filtering the image via convolution with a kernel before subsampling and subsequent reconstruction, following the sampling theorem [Shannon 1998]. However, along with aliasing, these strategies also smooth out some of the perceptually important details and features since the kernels used are agnostic to the image content.

A solution to this problem is adapting the kernel shapes to local image patches [Kopf et al. 2013] in the spirit of bilateral filtering [Tomasi and Manduchi 1998], so that they are better aligned with the local image features to be preserved. This strategy can significantly increase the crispness of the features while avoiding ringing artifacts typical for post-sharpening filters. However, it still cannot capture all perceptually relevant details, and as a result, might distort some of the perceptually important features and the overall look of the input image or lead to artifacts such as jagged edges [Kopf et al. 2013].

Loss of some of the perceptually important features and details stems from the common shortcoming of these methods that they operate with simple error metrics that are known to correlate poorly with human perception [Wang and Bovik 2009]. Significant improvements have been obtained for many problems in image processing by replacing these classical metrics with perceptually based image quality metrics [Zhang et al. 2012; He et al. 2014].

The standard approach to image downscaling involves limiting the spectral bandwidth of the input high resolution image by applying a low-pass filter, subsampling, and reconstructing the result. As is well-known in signal processing, this avoids aliasing in the frequency domain and can be considered optimal if only smooth image features are desired. Approximations of the theoretically optimum sinc filter, such as the Lanczos filter, or filters that avoid ringing artifacts such as the bicubic filter are typically used in practice [Mitchell and Netravali 1988]. However, these filters often result in oversmoothed images as the filtering kernels do not adapt to the image content. The same is true for more recent image interpolation techniques [Thevenaz et al. 2000; Nehab and Hoppe 2011].

Recently, Kopf et al. [2013] showed that significantly better downscaling results with crisper details can be obtained by adapting the shapes of these kernels to the local input image content. Since the kernels better align with the features in the input image, they capture small scale details when present. However, the method does not take perceptual importance of the features into account, resulting in loss of apparent details and hence leading to a rather abstract view of the input image. Indeed, the method is shown to provide excellent results for generating pixel-art images [Kopf et al. 2013].

Improvements in this image processing are desirable, in that they can reduce the amount of computing effort needed to obtain pleasing downscaled images.

REFERENCES

BANTERLE, F., ARTUSI, A., AYDIN, T., DIDYK, P., EISEMANN, E., GUTIERREZ, D., MANTIUK, R., and MYSZKOWSKI, K. 2011. Multidimensional image retargeting. In ACM SIGGRAPH Asia 2011 Courses, ACM, ACM SIGGRAPH Asia.

BONNIER, N., SCHMITT, F., BRETTEL, H., and BERCHE, S. 2006. Evaluation of spatial gamut mapping algorithms. In Proc. 14th Color Imag. Conf., 56-61.

BRUNET, D., VRSCAY, E., and WANG, Z. 2010. Structural similarity-based approximation of signals and images using orthogonal bases. In Image Analysis and Recognition, A. Campilho and M. Kamel, Eds., vol. 6111 of Lecture Notes in Computer Science. Springer Berlin Heidelberg, 11-22.

BRUNET, D., VRSCAY, E., and WANG, Z. 2012. On the mathematical properties of the structural similarity index. Image Processing, IEEE Trans. on 21, 4 (April), 1488-1499.

BRUNET, D. 2012. A Study of the Structural Similarity Image Quality Measure with Applications to Image Processing. PhD thesis, University of Waterloo.

CHAT, L., SHENG, Y., and ZHANG, J. 2014. SSIM performance limitation of linear equalizers. In Acoustics, Speech and Signal Processing (ICASSP), 2014 IEEE International Conference on, 1220-1224.

CHANNAPPAYYA, S., BOVIK, A., and HEATH, R. 2006. A linear estimator optimized for the structural similarity index and its application to image denoising. In *Image Processing, 2006 IEEE International Conference on,* 2637-2640.

CHANNAPPAYYA, S., BOVIK, A., CARAMANIS, C., and HEATH, R. 2008. SSIM-optimal linear image restoration. In *Acoustics, Speech and Signal Processing (ICASSP),* 2008. IEEE International Conference on, 765-768.

CHANNAPPAYYA, S., BOVIK, A., and HEATH, R. 2008. Rate bounds on SSIM index of quantized images. *Image Processing, IEEE Trans. on* 17, 9 (September), 1624-1639.

CHANNAPPAYYA, S. S., BOVIK, A. C., CARAMANIS, C., and JR., R. W. H. 2008. Design of linear equalizers optimized for the structural similarity index. *Image Processing, IEEE Trans. on* 17, 6, 857-872.

CHEN, G.-H., YANG, C.-L., and XIE, S.-L. 2006. Gradient-based structural similarity for image quality assessment. In *Image Processing, IEEE International Conference on*, 2929-2932.

DEMIRTAS, A., REIBMAN, A., and JAFARKHANI, H. 2014. Full-reference quality estimation for images with different spatial resolutions. *Image Processing, IEEE Trans. on* 23, 5 (May), 2069-2080.

DIDYK, P., RITSCHEL, T., EISEMANN, E., and MYSZKOWSKI, K. 2012. *Perceptual Digital Imaging: Methods and Applications*. CRC Press, ch. Exceeding Physical Limitations: Apparent Display Qualities.

DONG, J., and YE, Y. 2012. Adaptive downsampling for high-definition video coding. In *ICIP* 2012, 2925-2928.

GERSTNER, T., DECARLO, D., ALEXA, M., FINKELSTEIN, A., GINGOLD, Y., and NEALEN, A. 2012. Pixelated image abstraction. In *NPAR 2012, Proc. of the 10th International Symposium on Non-photorealistic Animation and Rendering*.

HE, L., GAO, F., HOU, W., and HAO, L. 2014. Objective image quality assessment: A survey. *Int. J. Comput. Math.* 91, 11 (November), 2374-2388.

KOPF, J., SHAMIR, A., and PEERS, P. 2013. Content-adaptive image downscaling. *ACM Trans. Graph.* 32, 6 (November), 173:1-173:8.

KRAWCZYK, G., MYSZKOWSKI, K., and SEIDEL, H.-P. 2007. Contrast restoration by adaptive countershading. In *Proc. of Eurographics* 2007, Blackwell, vol. 26 of *Computer Graphics Forum*.

LISSNER, I., PREISS, J., URBAN, P., LICHTENAUER, M. S., and ZOLLIKER, P. 2013. Image-difference prediction: From grayscale to color. *Image Processing, IEEE Trans. on* 22, 2, 435-446.

LIU, T., YUAN, Z., SUN, J., WANG, J., ZHENG, N., TANG, X., and SHUM, H.-Y. 2011. Learning to detect a salient object. Pattern Analysis and Machine Intelligence, *IEEE Trans. on* 33, 2 (February), 353-367.

MITCHELL, D. P., and NETRAVALI, A. N. 1988. Reconstruction filters in computer-graphics. In *Proc. of SIGGRAPH '88*, ACM, New York, N.Y., USA, 221-228.

NEHAB, D., and HOPPE, H. 2011. Generalized sampling in computer graphics. Tech. Rep. MSR-TR-2011-16, February.

OGAWA, T., and HASEYAMA, M. 2013. Image inpainting based on sparse representations with a perceptual metric. *EURASIP Journal on Advances in Signal Processing* 2013, 1.

PANG, W.-M., QU, Y., WONG, T.-T., COHEN-OR, D., and HENG, P.-A. 2008. Structure-aware halftoning. *ACM Trans. Graph.* 27, 3 (August), 89:1-89:8.

POLESEL, A., RAMPONI, G., and MATHEWS, V. J. 1997. Adaptive unsharp masking for contrast enhancement. In *ICIP '973—Volume Set—Volume 1—Volume 1*, IEEE Computer Society, Washington, D.C., USA, 267.

REHMAN, A., WANG, Z., BRUNET, D., and VRSCAY, E. 2011. SSIM-inspired image denoising using sparse representations. In *Acoustics, Speech and Signal Processing (ICASSP), 2011 IEEE International Conference on*, 1121-1124.

RITSCHEL, T., SMITH, K., IHRKE, M., GROSCH, T., MYSZKOWSKI, K., and SEIDEL, H.-P. 2008. 3D Unsharp Masking for Scene Coherent Enhancement. *ACM Trans. Graph. (Proc. of SIGGRAPH 2008)* 27, 3.

SHANNON, C. 1998. Communication in the presence of noise. *Proc. of the IEEE* 86, 2 (February), 447-457.

SHAO, Y., SUN, F., LI, H., and LIU, Y. 2014. Structural similarity-optimal total variation algorithm for image denoising. In *Foundations and Practical Applications of Cognitive Systems and Information Processing*, vol. 215. Springer Berlin Heidelberg, 833-843.

SILVESTRE-BLANES, J. 2011. Structural similarity image quality reliability: Determining parameters and window size. *Signal Processing* 91, 4, 1012-1020.

SMITH, K., LANDES, P.-E., THOLLOT, J., and MYSZKOWSKI, K. 2008. Apparent greyscale: A simple and fast conversion to perceptually accurate images and video. *Computer Graphics Forum (Proc. of Eurographics 2008)* 27, 2 (April).

TH'EVENAZ, P., BLU, T., and UNSER, M. 2000. Interpolation revisited. *Medical Imaging, IEEE Trans. on* 19, 7, 739-758.

TOMASI, C., and MANDUCHI, R. 1998. Bilateral filtering for gray and color images. In *Computer Vision, 1998. Sixth International Conference on*, 839-846.

TRENTACOSTE, M., MANTIUK, R., and HEIDRICH, W. 2011. Blur-Aware Image Downsizing. In *Proc. of Eurographics*.

WANG, Z., and BOVIK, A. 2009. Mean squared error: Love it or leave it? A new look at signal fidelity measures. *Signal Processing Magazine, IEEE* 26, 1 (January), 98-117.

WANG, Z., and LI, Q. 2007. Video quality assessment using a statistical model of human visual speed perception. *J. Opt. Soc. Am. A* 24, 12, B61B69.

WANG, Z., BOVIK, A., SHEIKH, H., and SIMONCELLI, E. 2004. Image quality assessment: from error visibility to structural similarity. *Image Processing, IEEE Trans. on* 13, 4 (April), 600-612.

WANG, S., REHMAN, A., WANG, Z., MA, S., and GAO, W. 2011. Rate-AAIM optimization for video coding. In *Acoustics, Speech and Signal Processing (ICASSP), 2011 IEEE International Conference on*, 833-836.

WU, X., ZHANG, X., and WANG, X. 2009. Low bit-rate image compression via adaptive down-sampling and constrained least squares upconversion. *Trans. Img. Proc.* 18, 3 (March), 552-561.

YEGANEH, H. 2014. *Cross Dynamic Range and Cross Resolution Objective Image Quality Assessment with Applications*. PhD thesis, University of Waterloo.

ZHANG, Y., ZHAO, D., ZHANG, J., XIONG, R., and GAO, W. 2011. Interpolation-dependent image downsampling. *Image Processing, IEEE Trans. on* 20, 11 (November), 3291-3296.

ZHANG, L., ZHANG, L., MOU, X., and ZHANG, D. 2012. A comprehensive evaluation of full reference image quality assessment algorithms. In *ICIP* 2012, 1477-1480.

ZHOU, F., and LIAO, Q. 2015. Single-frame image super-resolution inspired by perceptual criteria. *Image Processing, IET* 9, 1, 1-11.

SUMMARY

An image processor inputs a first image and outputs a downscaled second image by upscaling the second image to a third image, wherein the third image is defined by a third set of pixels derived from the second set of pixels establishing a third image size substantially the same size as the first image size with a third resolution, associating individual pixels in the second image with a corresponding group of pixels from the third set of pixels, sampling a first image area at a first location of the first set of pixels to generate a first image sample, sampling a second image area of the third set of pixels corresponding to the first image area location and size to generate a second image sample, measuring the similarity between the first image area and the second image area by processing the first image sample and the second image sample to generate a perceptual image value, recursively adjusting the values of third set of pixels until the image perception value matches a perceptual standard value within a pre-defined threshold, and adjusting individual pixel values in the second image to a representative pixel value of each of the corresponding group of pixels.

The following detailed description together with the accompanying drawings will provide a better understanding of the nature and advantages of the present invention.

BRIEF DESCRIPTION OF THE DRAWINGS

Various embodiments in accordance with the present disclosure will be described with reference to the drawings, in which:

FIG. 1 comprises FIG. 1A and FIG. 1B.

FIG. 2 comprises FIG. 2A and FIG. 2B.

FIG. 16 comprises FIG. 16A and FIG. 16B.

DETAILED DESCRIPTION

In embodiments described herein, an image processing engine inputs an image, processes it and outputs an output image where the output image is of smaller resolution than the input image and does so in a perceptually pleasing way, i.e., minimizing artifacts.

Figure 1A:
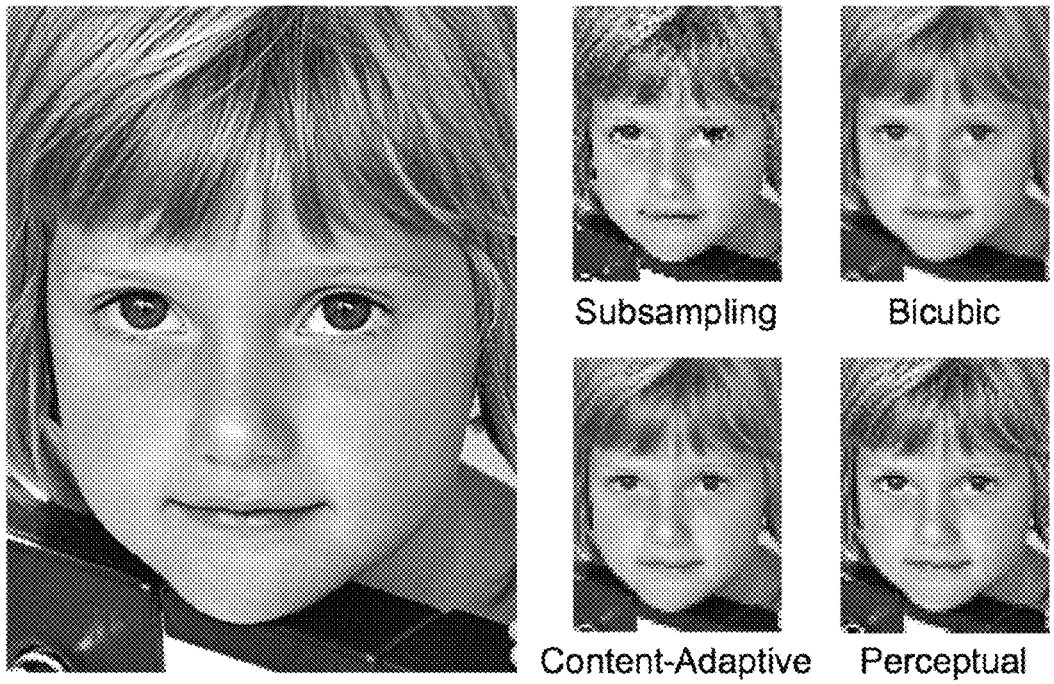
FIG. 1 illustrates artifacts of downscaling.
Figure 1B:
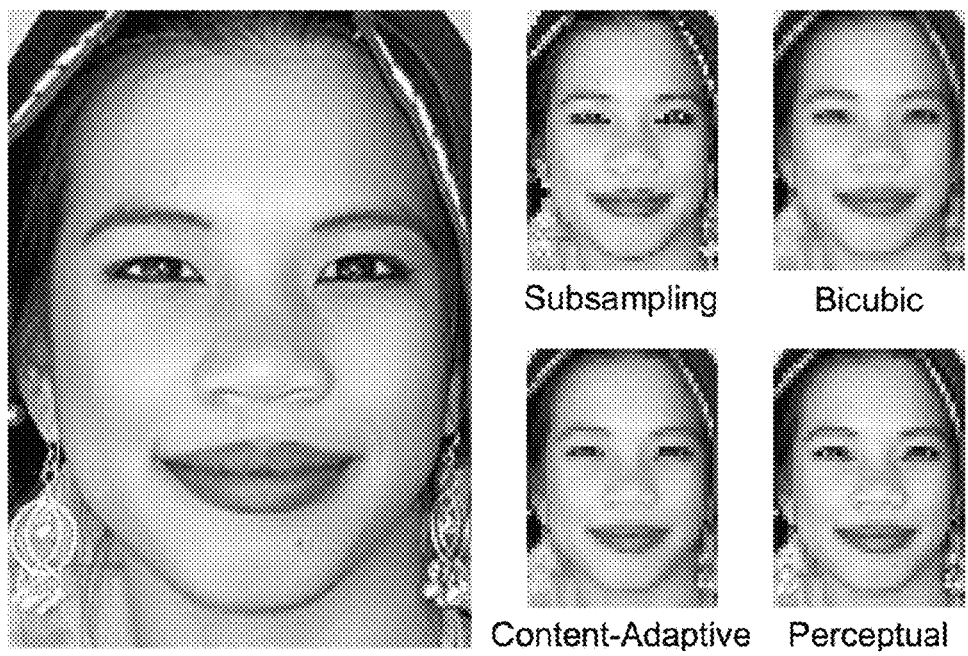

FIG. 1 illustrates some such artifacts. In each of FIGS. 1A and 1B, there is an input image on the left and four results of downscaling on the right. The subsampling output images, bicubic output images and content-adaptive output images use conventional approaches, whereas the perceptual output images use novel and improved techniques described herein in more detail.

The subsampling output image might be produced using classical downscaling algorithms that linearly filter the image via convolution with a kernel before subsampling and subsequent reconstruction, but can result in smoothing out some of the perceptually important details and features since the kernels used are agnostic to the image content.

Kernel shapes can be non-agnostic to local image patches and increase the crispness of the features while avoiding ringing artifacts typical for post-sharpening filters, but still might not capture all perceptually relevant details, and as a result, might distort some of the perceptually important features and the overall look of the input image, as in the content-adaptive output images. The bicubic output images also end up with undesirable artifacts.

As explained in more detail below, the perceptual image preserves perceptually important features and the overall look of the original images. A perceptual image quality measure can be used in the processing, instead of standard metrics.

Loss of some of the perceptually important features and details stems from the common shortcoming of these methods that they operate with simple error metrics that are known to correlate poorly with human perception [Wang and Bovik 2009]. Significant improvements have been obtained for many problems in image processing by replacing these classical metrics with perceptually based image quality metrics [Zhang et al. 2012; He et al. 2014].

A standard approach to image downscaling involves limiting the spectral bandwidth of the input high resolution image by applying a low-pass filter, subsampling, and reconstructing the result. As is well-known in signal processing, this avoids aliasing in the frequency domain and can be considered optimal if only smooth image features are desired. Approximations of the theoretically optimum sinc filter, such as the Lanczos filter, or filters that avoid ringing artifacts, such as the bicubic filter, are typically used in practice. However, these filters often result in oversmoothed images as the filtering kernels do not adapt to the image content.

For natural images, the methods described herein can perform significantly better and provide crisper depictions of a high resolution input image by incorporating a perceptual metric. These methods also can provide better spatio-temporal consistency with less apparent aliasing artifacts, and run orders of magnitude faster with a simple and robust implementation, thus saving on computing resources.

Downscaling operators are also designed for other related problems. Several algorithms carefully tune the downscaling operators and filters to the interpolation method used for subsequent upscaling. Those methods do not really address perceptual quality of the downscaled image itself. Thumbnail generation tries to preserve the imperfections, in particular blurriness in the original images for accurate quality assessment from the downscaled images. In contrast, the downscaling problem can be regarded as selectively adjusting the blur to preserve the important details and overall look of an input image. Another related set of algorithms deals with retargeting images by changing the aspect ratios of input images [Banterle et al. 2011], while preserving important parts such as foreground objects in the image by carefully modifying the image content.

The embodiments described herein are able to keep the image content close to that of the original image and target resolution reductions far more than the retargeting algorithms are normally designed for. Image abstraction methods can be used to generate artistic depictions of an input image such as via pixel art [Gerstner et al. 2012] by reducing the resolution as well as the color palette. The embodiments described herein provide better results by targeting realistic depictions of the input image.

As explained herein, the image processing engine can treat image downscaling as an optimization problem with SSIM as the error metric. This can provide a significant advantage for preserving perceptually important features. Also, a closed-form solution can be derived for the downscaling problem. This provides a perceptually based method for downscaling images that provides a better apparent depiction of the input image. Image downscaling can be treated as an optimization problem where the difference between the input and output images is measured using a perceptual image quality metric. The downscaled images retain perceptually important features and details, resulting in an accurate and spatio-temporally consistent representation of the high resolution input. Our downscaling method preserves perceptually important fine details and features that cannot be captured with other metrics, resulting in crisper images that provide a better depiction of the original image.

The image processing engine can derive the solution of the optimization problem in closed-form, which leads to a simple, efficient and parallelizable implementation with sums and convolutions. The process has computer run times similar to linear filtering and is orders of magnitude faster than the state-of-the-art for image downscaling. Herein, validation of the effectiveness of the technique is provided with test results from extensive tests on many images, video, and by results of a user study, which indicates a clear preference for the results of the processes described herein.

The downscaling problem is treated as an optimization that solves for the downscaled output image given the input image. The error between the two images is measured using the structural similarity (SSIM) index [Wang et al. 2004]. The use of SSIM in optimization problems has been hindered by the resulting non-linear non-convex error functions [Brunet et al. 2012]. However, as explained herein, for the downscaling problem, it is possible to derive a closed-form solution to this optimization. The solution leads to a non-linear filter, which involves computing local luminance and contrast measures on the original and a smoothed version of the input image. Although the filter is seemingly different than SSIM without any covariance term, it maximizes the mean SSIM between the original and downscaled images.

The downscaled images do not exhibit disturbing aliasing artifacts for natural images and are spatio-temporally more coherent than methods based on kernel optimizations [Kopf et al. 2013]. This allows the engine to apply the technique to video downscaling as well. The resulting process has a very simple, efficient, and parallelizable implementation with sums and convolutions. It thus has a computational complexity similar to the classical filtering methods, and runs orders of magnitude faster than the state-of-the-art [Kopf et al. 2013].

Standard error metrics such as the mean squared error is well-known to correlate poorly with human perception when measuring image differences [Wang and Bovik 2009]. Instead, for the assessment of the quality of images and video, a variety of perceptually based image quality metrics has been proposed. Full reference quality metrics refer to the assumption that an input image can be compared to an available reference image for quality assessment. For the downscaling problem, the input image is the reference, and the downscaled output is the image to be assessed.

The engine uses the structural similarity (SSIM) index [Wang et al. 2004], which is one of the most widely used and successful full reference image quality metrics [Brunet et al. 2012], but other metrics might be used as well or instead. SSIM represents a matching score between two images by local luminance, contrast, and structure comparisons. Given a high resolution input image H, the engine seeks to find the down-scaled output image D that is as close as possible to H as measured by the SSIM index. The dissimilarity measure between images H and D is denoted d(H,D). A goal is the image D* that minimizes this measure d(H,D). This measure can be obtained using images that are single-channel images, such that each pixel of H and D contains a single number in the dynamic range [0, 1], and further assume for simplicity that the width and height of H are downscaled by an integer factor, s, to produce D. If the actual downscaling factor is not an integer, the engine can preprocess and upscale the input image by bicubic filtering such that the factor becomes an integer. Similar approaches can be taken for multi-channel images.

Figure 2A:
FIG. 2 illustrates various approaches to downscaling.
Figure 2B:
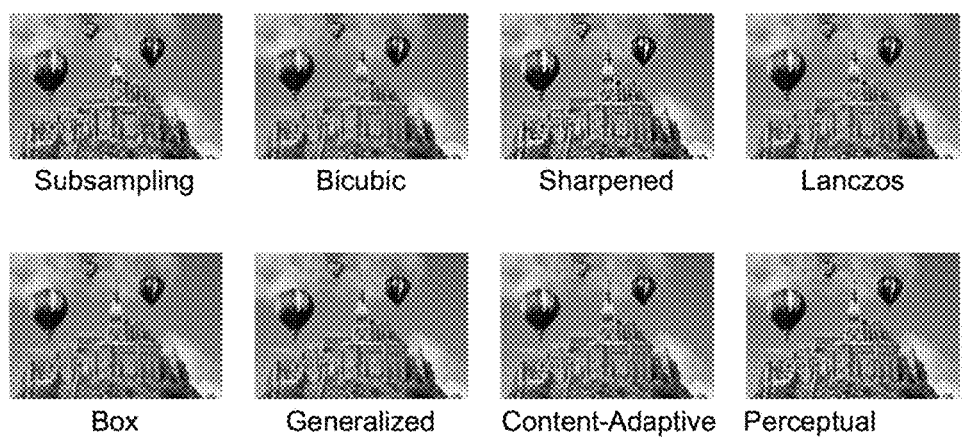

FIG. 2 illustrates various approaches to downscaling. FIG. 2A is the input image and FIG. 2B illustrates eight examples of output images, wherein the one in the lower right is produced by optimizing the perceptual metric. Commonly used filters for downscaling, such as the box or bicubic filter, result in oversmoothing. Trying to avoid oversmoothing by post-sharpening the downscaled images (Sharpened image) or using the Lanczos filter can lead to ringing artifacts and the small-scale features can still not be recovered. Generalized sampling [Nehab and Hoppe 2011] and content-adaptive downscaling [Kopf et al. 2013] can produce crisper images, but cannot preserve perceptually important details. In contrast to the others, the by using the perceptual metric, a perceptually optimum image as measured by this metric is generated.

Most image quality assessment measures are not designed to compare images of different spatial resolutions [Yeganeh 2014]. For images of different resolutions, there are two common simple approaches: downscaling the higher resolution image, or upscaling the lower resolution one [Demirtas et al. 2014]. To not lose the information present in H, the engine upscales D to form an upscaled image X that has the same dimensions as H.

Figure 3:
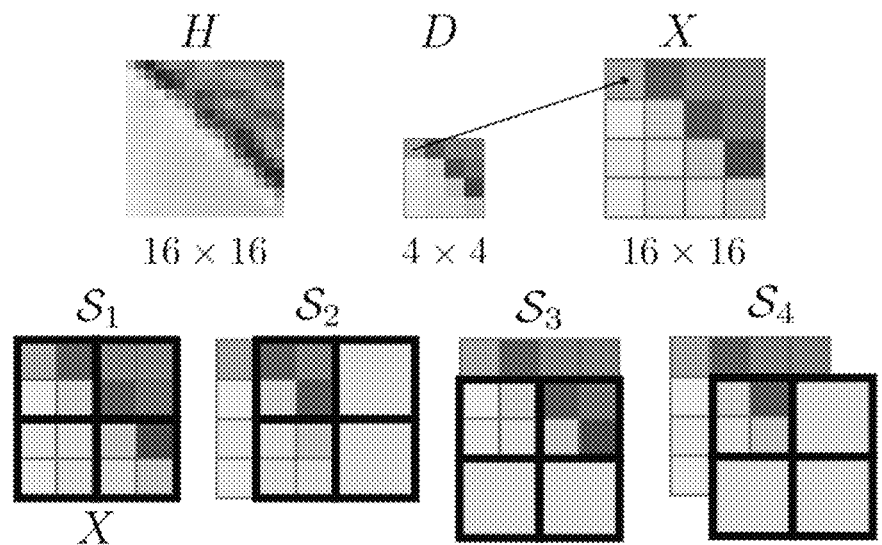
FIG. 3 illustrates a process an image downscaling engine might use to perform a piecewise constant interpolation.

FIG. 3 illustrates a process the engine might use to perform a piecewise constant interpolation, with each pixel of D replicated in $s^2$ pixels of X. In the upper left is the input high resolution image H (16 by 16 pixels), the downscaled image D (4 by 4 pixels) in the center, and its scaled version X (16 by 16 pixels) on the right. Each pixel of D is replicated in 16 pixels of X. Also illustrated there are "patch sets." A patch set, $S_k$ (k=1, 2, . . . , $n_p$) contains patches that do not overlap (tiles). In this example, there are 2 by 2 patches on D, so $n_p$=4. The patch sets are shifted by 4 pixels in X and H, which corresponds to a shift of 1 pixel in D.

The SSIM index is a local measure of similarity computed between local patches of images. These similarity scores are then summed for all patches to compute the mean SSIM. Denoting the $i^{th}$ patch of image X by $P_i(X)$, the downscaling problem can thus be written as finding the optimum X* that satisfies Equation 1 for some set, S, of patches with the constraint that each group of pixels of X that corresponds to a single pixel of D has the same pixel value.

$$X^* = \mathrm{argmin}_X \Sigma_{P_i \in S} d(P_i(H), P_i(X)) \qquad \text{(Equ. 1)}$$

The pixel values of X do not have to be constrained to be in [0,1] and the optimized D might contain a small number of pixels negligibly outside of the dynamic range. The shapes and the set of the patches can be defined in various ways, depending on the application considered [Silvestre-Blanes 2011]. For a given patch size $n_p$, the engine uses the set S of all possible square patches of width (and height) $s = \sqrt{n_p}$ (excluding the patches not completely within the image limits), but in patch sets such that each patch set $S_k$ contains only non-overlapping patches, and where S is the union of all of the patch sets $S_k$. The final X* is computed by averaging the solutions $X_k^*$ of the problem in Equation 1 for different patch sets. Since each group of $s^2$ pixels in X actually corresponds to a single pixel in D, integer patch shifts in D lead to shifts by s in H and X The patch sets $S_k$ for a small example image with $n_p=4$ are shown in the bottom row of FIG. 3. The solution does not deviate much for other choices of patch sets, with $n_p$ chosen as described herein.

Figure 4:
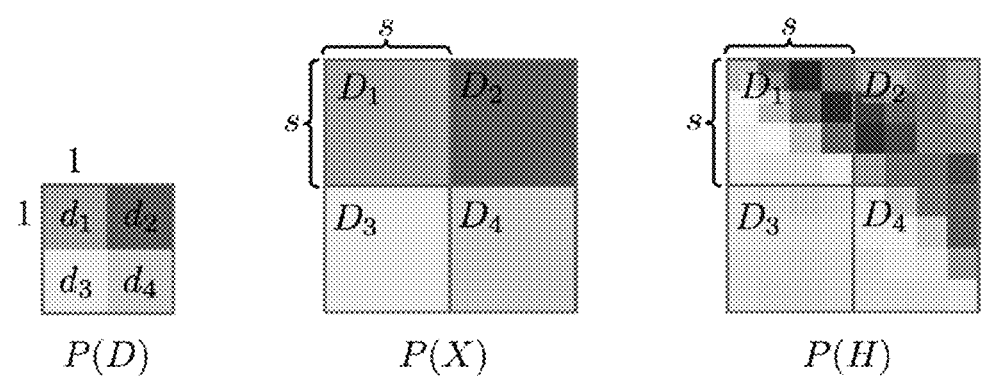
FIG. 4 illustrates a process the engine performs to compute various values.

FIG. 4 illustrates the process the engine performs to compute the various values. Each pixel, $d_i$, in the output downscaled image patch P(D) is mapped to a set, $D_i$, of $s^2$ pixels in the patches P(X) and P(H). All $s^2$ pixels in D, of P(X) have value $d_i$. Since the patches in S do not overlap, the pixels of each patch can be optimized independently of the other patches. Hence, for a patch, P, in $S_k$, the optimum patch P*(X) of the image X is given by Equation 2.

$$P^*(X) = \underset{P(X)}{\arg\min}\, d(P(H), P(X)) \quad \text{(Equ. 2)}$$

The pixels of the patches can be represented by the engine as stacks on the vectors h and x. Similarly, the pixels of D that correspond to x can be represented with d, and the set of pixels in P(X) that corresponds to the $i^{th}$ pixel in the patch in D can be represented by $D_i$, as in FIG. 4. Hence, x=Vd, where the j-th $v_i$ of V is 1 if $x_j \in D_i$, and 0 otherwise. Then, the above computation could be expressed as in Equation 3.

$$x^* = \underset{x}{\arg\min}\, d(h, x), x = Vd \quad \text{(Equ. 3)}$$

The SSIM index is computed by multiplying three components corresponding to luminance, contrast, and covariance based comparisons. The widely used form of SSIM is given by [Brunet et al. 2012] as in Equation 4, where $\mu_x = \Sigma w_i x_i$ denotes the mean, $\sigma_x^2 = \Sigma w_i (x_i - \mu_x)^2$ the variance, and $\sigma_{xh} = \Sigma w_i (x_i - \mu_h)$ the covariance with weights $w_i$, and $x_i$ denoting the $i^{th}$ component of x.

$$SSIM(h, x) = \frac{(2\mu_h \mu_x + c_1)(2\sigma_{xh} + c_2)}{(\mu_h^2 + \mu_x^2 + c_1)(\sigma_h^2 + \sigma_x^2 + c_2)}, \quad \text{(Equ. 4)}$$

The values $c_1$ and $c_2$ are small constants added to avoid instability. For the simplicity of the expressions, and since the small values used in practice do not affect results for the downscaling problem, the constants can be set as $c_1=c_2=0$. Since $x_i$ and $h_i$ are in [0,1], SSIM(x,h)∈[0,1]. It is 1 when x=h, and decreases as the patches become less similar. Herein, a dissimilarity measure d(h,x) can be defined as 1−SSIM(h,x).

The d(•,•) is not a distance function, and not even convex. Instead of directly trying to solve the problem in Equation 3, we thus define another problem that is easy to be solved, by parametrizing the solution to the original problem. Specifically, we fix the mean $\mu_x$ and variance $\sigma_x$ of x to arbitrary values, leaving only $\sigma_{xh}$ as the free term in SSIM (Equation 4). We thus optimize for $\sigma_{xh}$ under these constraints to get the optimum for this subproblem. Finally, we find the $\mu_x$ and $\sigma_x$ that gives the global optimum. As detailed below, the global optimum can be obtained by setting $\mu_x=\mu_h$, and $\sigma_x=\sigma_h$, and solving Equation 5.

$$\max_{x} \sigma_{xh}, \mu_x = \mu_h, \sigma_x = \sigma_h, x = Vd \quad \text{(Equ. 5)}$$

Note that since x=Vd, the terms $\mu_x$, $\sigma_x$, and $\sigma_{xh}$ can also be expressed in terms of d. For example, we can write $\mu_x = w^T x = (V^T w)^T d = m^T d$ with $$m = \left[ \sum_{x_i \in D_1} w_i \, \ldots \, \sum_{x_i \in D_{n_p}} w_i \right]^T.$$

Similarly, $\sigma_x^2 = d^T - \mu_x^2$ and $\sigma_{xh} = a^T d - \mu_x \mu_h$, where M is a diagonal matrix with $M_{ii}=m_i$, and $a_i = \Sigma_{h_j \Sigma D_i} w_j h_j$. With these substitutions, the computation in Equation 5 becomes that of Equation 6, the solution of which is provided in Equation 7 with $l_i = a_i/m_i$, and $\sigma_l^2 = \Sigma_{i=1}^{n_p} m_i (l_i - \mu_h)^2$.

$$\max_{d} a^T d, m^T d = \mu_h, d^T M d = \mu_h^2 + \sigma_h^2 \quad \text{(Equ. 6)}$$

$$d_i^* = \mu_h + \frac{\sigma_h}{\sigma_l}(l_i - \mu_h), \quad \text{(Equ. 7)}$$

See below for discussion of SSIM based optimization and global optimums. Solutions of optimization problems involving the SSIM index by fixing the mean have been utilized for other applications, where the optimum is then searched for using iterative methods [Channappayya et al. 2008a; Ogawa and Haseyama 2013; Shao et al. 2014]. However, closed-form solutions could only be derived for simple image models [Channappayya et al. 2006; Chai et al. 2014], or expansions on Fourier type bases [Brunet et al. 2010]. Although the images H and D, or basis vectors $v_i$ do not satisfy the properties required for these solutions, using techniques described herein, a closed-form solution can be derived due to the structure of the downscaling problem.

For each pixel in the output image D, there is an optimum value from each patch overlapping that pixel. Each of these patches belongs to a different patch set $S_k$. The final value of the pixel is found by averaging these values. The weights, $w_i$, are usually taken from a Gaussian or constant window [Silvestre-Blanes 2011; Brunet 2012]. Following the latter, the weights can assumed to be uniformly summing to 1, since patches are rather small. Then, the value for the $i^{th}$ pixel in image D (the i is now defined as a global index in D) is as shown in Equation 8 where $P_k$ denote the $n_p$ patches overlapping this pixel.

$$d_i^* = \frac{1}{n_p} \Sigma_{P_k} \mu_h^k + \frac{\sigma_h^k}{\sigma_l^k}(l_i - \mu_h^k) \quad \text{(Equ. 8)}$$

The form of the optimum image in Equation 8 is a non-linear filter on the input image H. The filter adapts to the image content in a perceptually optimal way as measured by the SSIM index. The engine includes means or programming instructions for implementing this filter. The construction of the solution makes it clear that it preserves the local luminance and contrast of the input image H while maximizing local structural similarity. Although the filter is non-linear, it can be implemented with a series of linear operations as apparent from Equation 8, as described by the pseudocode presented hereinbelow.

Discussion and Analysis

We can view Equation 8 as an adaptive unsharp masking filter [Polesel et al. 1997] applied to the averaged $l_i$ values, where the sharpening factor depends non-linearly on the local image content with the ratio $\sigma_h^k/\sigma_l^k$ of the standard deviations of the input image, and a filtered version of it. This ratio thus adaptively adjusts the filter using H as the reference image so as to preserve the local features. Unsharp masking combined with pixel-wise contrast measures extracted from a reference image has previously generated excellent results for enhancing images generated by tone mapping [Krawczyk et al. 2007] or color to greyscale conversion [Smith et al. 2008], as well as for rendered scenes [Ritschel et al. 2008]. The SSIM-optimal filter here leads to a similar term for the downscaling problem.

Figure 5:
FIG. 5 illustrates post-sharpening after filtering.

FIG. 5 illustrates post-sharpening after filtering. In the top right image, sharpening results in severe ringing and fails to capture the small-scale details in the background. The Lanczos filter (middle right image) can reduce ringing but still cannot capture the details well. The method described herein (bottom right image) utilizes the local content in the input image to avoid artifacts while preserving details.

It is well-known that trying to get sharper results by using a post-sharpening step after filtering, or a filter that generates sharper results by better approximating the sinc filter leads to artifacts when used for image downscaling [Kopf et al. 2013]. The methods described herein avoid such problems and lead to better preservation of image features. Post-sharpening after filtering leads to severe ringing on the foreground object while failing to preserve the contrast in the background. This approach is fundamentally disadvantaged since the sharpening filter cannot use information from the original high resolution image to enhance the downscaled image. The Lanczos filter reduces the artifacts, but also fails to preserve the background. The adaptivity of the derived filter in Equation 8 ensures that all features are preserved while avoiding the ringing artifacts.

While a number of parameters might be varied, the main free parameter is the patch size, $n_p$. In general, determining the patch size for SSIM to best correlate the results with the response of the human visual system is a difficult problem. However, recent works confirm that as the image complexity increases, the window size should be reduced [Silvestre-Blanes 2011]. For the downscaling problem, it is crucial to capture the local structures in the input image H as well as possible. However, as the downscaling factor s increases, the patch size $s\sqrt{n_p}$ in H also gets bigger. Thus, for our problem, it is preferred to keep the patch size $n_p$ as small as possible, such as $n_p=4$, for a 2 by 2 patch. A similar conclusion stems from the interpretation of the filter as an adaptive unsharp mask. The smoothed image in unsharp masking, corresponding to the averaged means $\mu_h^k$ of the patches in our case, can be made smoother to capture lower frequency bands. However, many lower bands are already captured in D. Furthermore, as the patch size gets larger, the ratio of the standard deviations decrease, leading to less enhancement.

Figure 6:
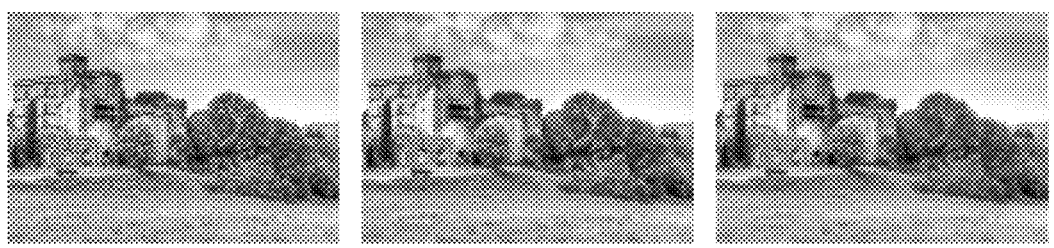
FIG. 6 illustrates the effects of the patch size on downscaled images.

FIG. 6 illustrates the effect of the patch size on the downscaled images. Increasing the patch size from left to right shows a loss of small scale features. In these example, from left to right, the patch sizes are $2^2$, $8^2$, and $32^2$. As the patch size increases, small scale features are lost. In the limit that the whole image is covered by one patch, the downscaled image approaches the filtered image given by $l_i$, since the contrasts $\sigma_h$ and $\sigma_l$ can be matched almost exactly.

Since the values of the pixels in D are not constrained to lie in [0, 1] in the optimization, some pixels might end up having values outside this dynamic range. However, since the mean and standard deviations match for the optimum solution, in practice, the percentage of these pixels and their distance to the dynamic range is negligible for natural images.

Figure 7:
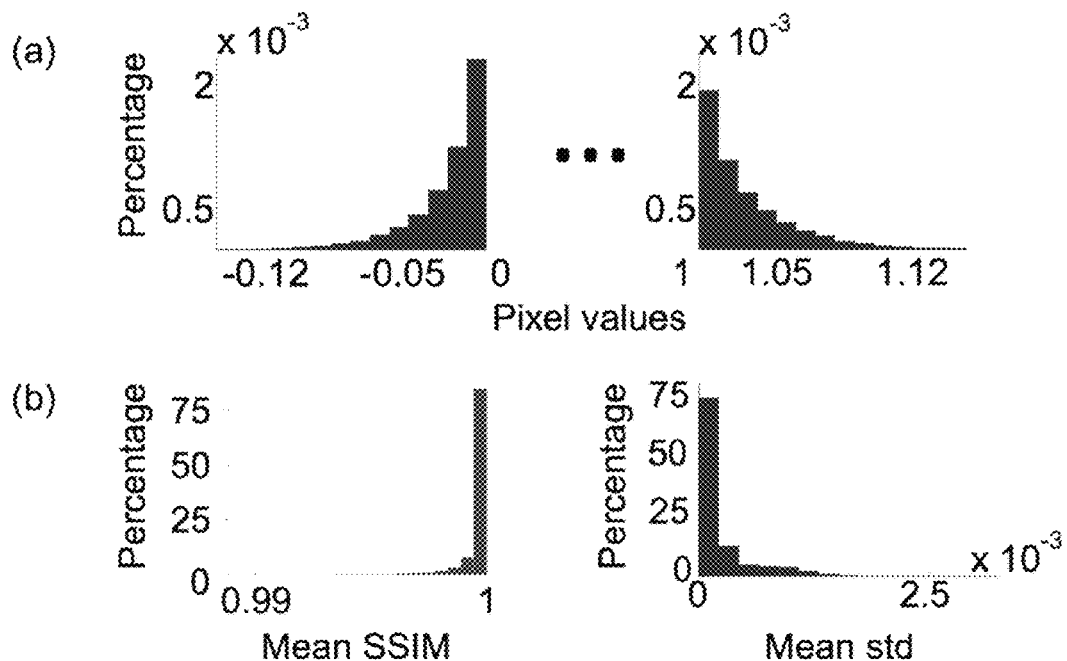
FIG. 7 illustrates results of deviations.

FIG. 7 illustrates this point. For the upper plots, the percentage of pixel values outside the dynamic range for 3000 random natural images for seven different sizes is shown. The lower plots show that for each of the input images and sizes, the mean SSIM index and mean standard deviation between the downscaled image generated using all $S_k$ by averaging and those generated using individual $S_k$'s, are computed. FIG. 7 shows the histograms of these values over the same set of images and sizes as in the top plots. Both measures show that optimizing over different sets does not alter the solution significantly. Working with a small patch size of 2 by 2, the choice of the patch sets does not lead to a noticeable difference. The resulting optimized images for different patch sets $S_k$ and their mean (the SSIM-optimal image) are almost identical. In FIG. 7, the distributions of the mean SSIM indices and mean standard deviations are shown computed between the mean image (our solution) and the images optimized over different $S_k$'s, for the same set of 3000 images and seven sizes as above. Both measures indicate that the resulting images are almost identical.

Figure 8:
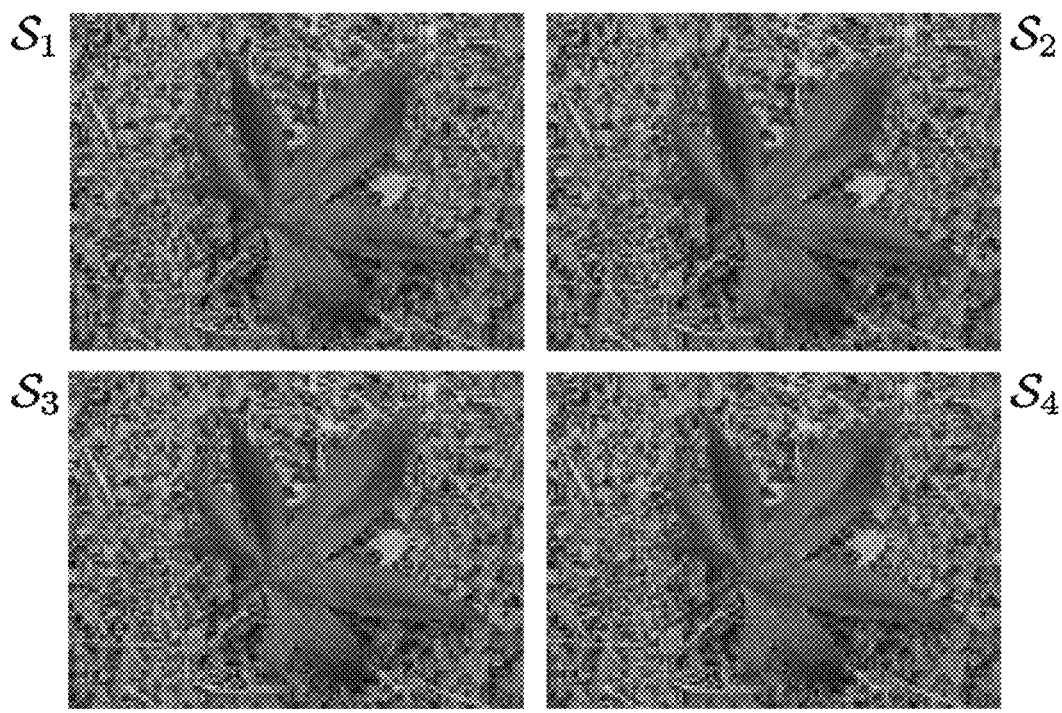
FIG. 8 illustrates an example image optimized over different patches.

FIG. 8 illustrates an example image optimized over different $S_k$. The images are almost identical and differ slightly in some of the patches where the texture has large and high frequency variations.

For some of the patches, the intensities $l_i$ can be constant such that we get $\sigma j=0$. For these cases, there might be no way to match the contrast, as required by the solution, and only the mean can be matched. Hence, for a patch with $\sigma_l<10^{-6}$, we set the values of the pixels of the downscaled image in this patch to the mean $\mu_h$ of the patch.

SSIM is defined for images with a single channel, although some works explore utilizing extracted features [Lissner et al. 2013], or working in various color spaces [Bonnier et al. 2006]. The engine can use the RGB space for all image processing and apply the downscaling to each channel independently.

Results

We performed a large number of experiments to validate the practical value of our method with thousands of images and many different downscaling factors, a detailed analysis, comparisons to existing methods, and a formal user study.

Downscaling Results and Analysis

Figure 10:
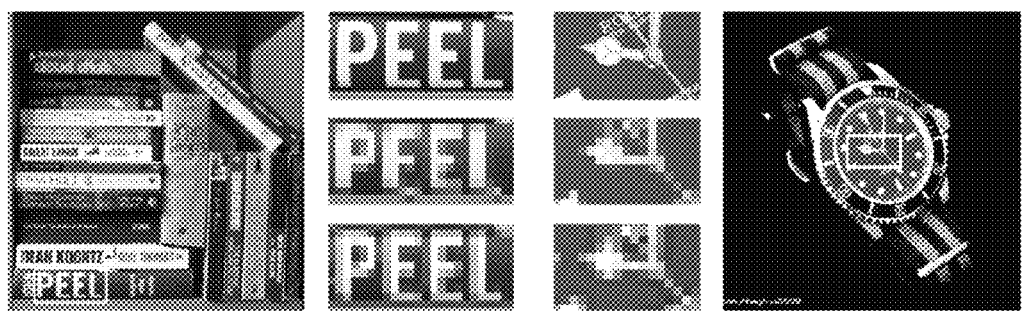
FIG. 10 illustrates other aspects of image processing.

Our technique generates local pixel patterns that form structures resembling those in the input image, when viewed by a human observer. This effect is most apparent when there are perceptually important features (as in FIGS. 1, 10), textures (as in FIGS. 15, 16), or other small-scale details (as in FIGS. 1, 2, 15, 16, 17) in the input images. While trying to capture as much structure as possible, it also preserves the local contrast and luminance of the input image, which makes the overall look of the downscaled image close to the input (e.g., FIGS. 1, 16).

Figure 9:
FIG. 9 illustrates a downscaled edge of a picture frame.

The downscaling process performed by the engine does not significantly alter the features that are already captured by low-pass filters. This results in less jagged edge artifacts than previous downscaling methods. For example, FIG. 9 illustrates a downscaled edge of a picture frame. The input images on the left and on the right are four output images. From top to bottom of the right side of FIG. 9, the output images are done by the original image, bicubic filtering, content-adaptive downscaling, and our process, respectively. Our process preserves the details better while leading to less jaggy edge effects. Our method performs a slight enhancement on the edge, resulting in fewer artifacts than with the content-adaptive method. If some details cannot be captured with the pixel budget in the downscaled image, they are mapped to noise-like structures that resemble those in the input image if viewed at the native resolution, as opposed to Moiré patterns, as with subsampling.

Figure 11:
FIG. 11 illustrates other aspects of image processing.

FIG. 11 illustrates this, with the left image being bicubic filtering, the middle image being subsampling (to Moiré patterns showing), and our result without Moiré patterns. The method is also spatio-temporally consistent, leading to accurate representation of features, as can be clearly seen in FIG. 1, right, and FIG. 10. Classical filtering methods such as bicubic filtering are also consistent, but fail to generate crisp images. Aligning the kernels to local image features [Kopf et al. 2013] can generate crisper results, but the resulting kernels can miss or distort some features as in FIG. 10, and small changes in input images are sometimes amplified, leading to flickering, as might have to be dealt with when downscaling video. In the sets of three images in the center of FIG. 10, the top is the original image, the middle is content-adaptive downscaling [Kopf et al. 2013], and the bottom is our result. The features are kept intact with our method.

There are numerous studies on the correlation of the SSIM index with human perception when used as an image quality measure [Wang and Bovik 2009]. However, our particular problem of downscaling called for a tailored formal user study. The design of our user study follows that of the previous study performed by Kopf et al. [2013], including the images used and all design choices.

The study is based on presenting the participants a large image and two downscaled versions of that image. The participant is then asked to select the small image that she/he thinks represents a better downscaled version of the large image, or indicate no preference. One of the small images presented for each test is computed using our process described herein and the other by a different process, such as subsampling, the classical box, bicubic, Lanczos filtering, bilateral filtering, generalized sampling [Nehab and Hoppe 2011], and content-adaptive downscaling [Kopf et al. 2013]. There were 125 participants in the study.

The 13 natural images used in the study, originally from the MSRA Salient Object Database [Liu et al. 2011], are the same as the ones used in the previous study [Kopf et al. 2013]. We show some example results in FIG. 16. They cover a variety of scenes with different types and scales of structures. The images were shown at the native resolution of the display, and zooming was not provided. The long side of the large images is 400 pixels, and that of the small images is 128 pixels. The study was performed online with participants from different parts of the world, educational backgrounds, occupations, and computer experience. Similar to the previous study [Kopf et al. 2013], we allowed the participants to move closer to the screen if they would like to, as would happen in practice for real-world situations. Each test for a particular participant involved a different image, and was repeated twice to check for consistency. All the results coming from subjects with consistency lower than 80% were discarded [Kopf et al. 2013], leaving results from 64 participants (the results do not change significantly for other rejection rates). There was no time limit to finish the study.

Figure 12:
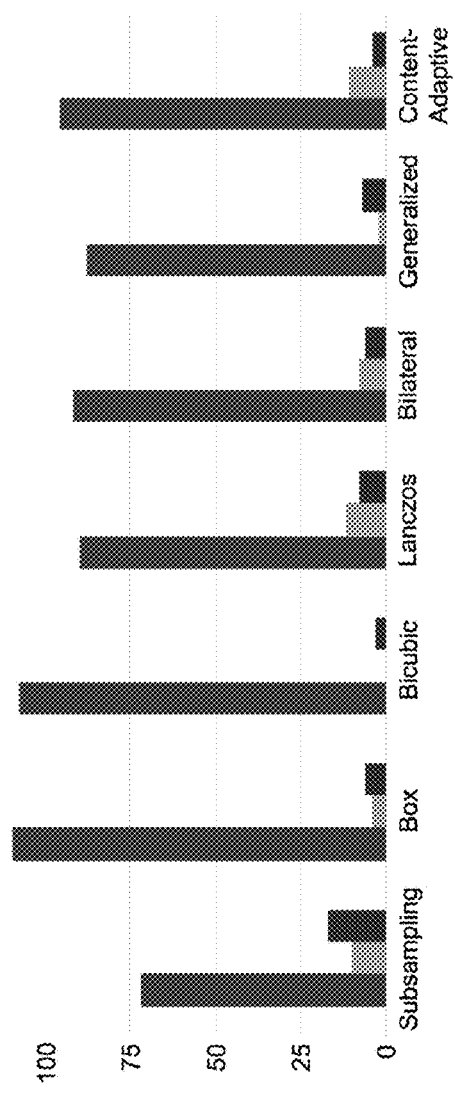
FIG. 12 illustrates user study results.

FIG. 12 illustrates user study results. In each group of three bars, the left bars represent how many times a user selected the downscaled image done by our process, the middle bars represent how many times the user indicated no preference, and the right bars represent how many times the user indicates a preference for the other process. The study showed a clear preference for the results of our process against competing methods. The best competing downscaling method is simple subsampling, which was also the case for the previous study [Kopf et al. 2013]. Since subsampling does not involve any filtering, it preserves the crisp look of the images well, of course at the cost of well-known strong aliasing artifacts. For the user study images where these artifacts are not visible, the participants could not decide which image to choose. For other images where the artifacts are noticeable, there is a clear preference for our images. Hence, our process preserves the crisp look of the images as in subsampling, but without the visible aliasing artifacts.

Implementation and Performance

The methods here can be based on a non-linear filter on the input image and can be implemented very efficiently and robustly with simple convolutions and sums.

Pseudocode for a process is provided further below. This process was implemented in Matlab with native Matlab operators, some of which use multiple CPU cores. We performed a performance test with 100 randomly chosen images on a computer with the configuration Intel Core i7 3770K CPU @350 GHz. The method of Kopf et al. [2013] was run as a native executable. The results of the test are reported in FIG. 13 for different input image sizes (with output image size fixed to 80 by 60), and output sizes (with input image size 640 by 480).

Figure 13:
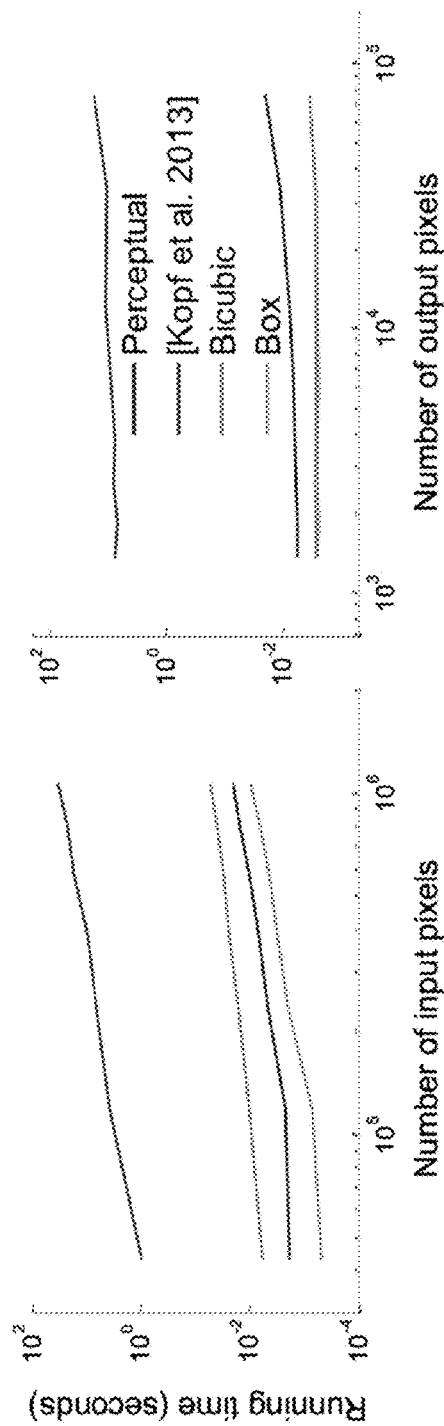
FIG. 13 illustrates test results.

Our process is only a few times slower than the box filter we used in the implementation of our algorithm, and 500 to 5000 times faster than the method of Kopf et al. [2013] that relies on an iterative expectation-maximization based optimization. In this test, the engine ran two box filterings followed by subsampling on the input image, and further operations on images of size proportional to the output image as can be seen in the pseudocode. For smaller output sizes relative to the input size, it performs closer to the initial box filter we used, while increasing the output size slows it down a few times, as can be seen in FIG. 13, right.

Variations

Figure 14:
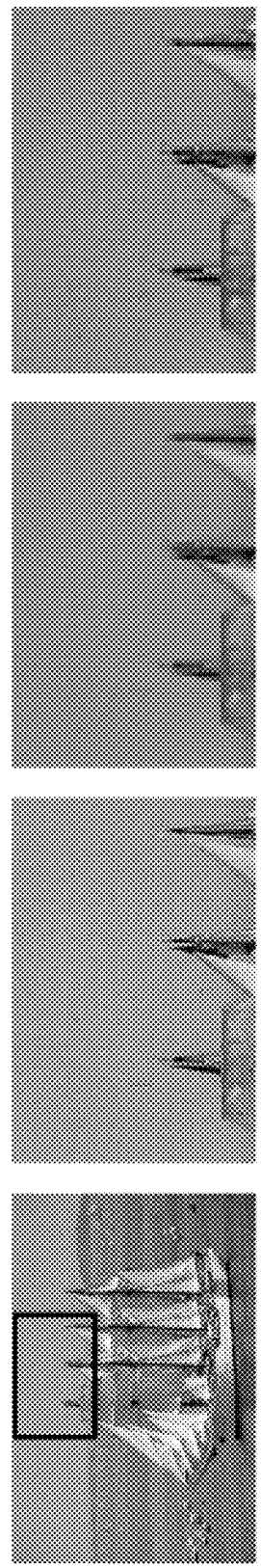
FIG. 14 illustrates image smoothing.

Other variations might address the indifference to scene semantics. Seeing local structures in an image without any reference to what they actually represent may lead to preservation of undesired details such as noise present in the input image, as we show in FIG. 14, which is smoothed out by non-adaptive filters. In FIG. 14, the inserts, from left to right, are the original image, bicubic filtering, and our result. Since our method lacks scene semantics, it tries to preserve the noise in the input image.

Our results exhibit fewer jagged edges (FIG. 9) and aliasing artifacts (FIG. 11) than methods that generate crisp images. However, if the image contains very regular repeating structures with a high frequency, aliasing can happen. The SSIM index tends to not prefer patches with a constant value, since this makes the index 0. Instead, our algorithm tries to reproduce the local contrast and structure. However, for perfectly regular structures, a constant patch value might be preferred instead. For those cases, such as on standard aliasing tests, we can get artifacts similar to those produced by previous enhancement methods [Kopf et al. 2013]. Fortunately, such regular structures are rarely present in natural images. We observed that the small perturbations to regular structures that exist in most natural images can break the artifacts, as in FIG. 11.

The SSIM index is known to not preserve the blur in the images [Chen et al. 2006]. We also observed that as opposed to thumbnail generation methods, our downscaling results do not contain the same amount of blur in the input image, especially for high downscaling ratios. We experimented with an extension of SSIM in the gradient domain, by solving for the gradients of the downscaled image, and subsequently a Poisson equation to get the actual image and with some additional steps, this might work.

Additional Variations

We used the basic form of the SSIM index. There are numerous extensions that modify the local similarity measure, the patch averaging stage, or extend it to feature and color spaces. Although the downscaled videos exhibit less flickering due to the consistency of the filter, better downscaling results can be obtained by incorporating extensions of the SSIM index to videos, e.g. models of speed perception [Wang and Li 2007]. Other perceptual measures might be utilized to improve image scaling results.

The SSIM index sees the image at the level of patches, and cannot by itself adapt to scene semantics. This leads to problems such as the noise amplification in FIG. 14. Scene semantics such as background/foreground separation, properties of the objects in the scene, or saliency maps can be integrated into our algorithm by adaptively weighting the patches, or adjusting the parameters ($\alpha,\gamma$) and patch size locally.

CONCLUSIONS

A novel method for image downscaling is provided that aims to optimize for the perceptual quality of the downscaled results. Extensive tests involving hundreds of images and the user study clearly indicate that it generates perceptually accurate and appealing downscaling results, outperforming previous techniques. Despite its effectiveness and non-linear nature, it has a very simple, robust, efficient, and parallelizable implementation, making the algorithm a practical addition to the arsenal of image filters.

Figure 15:
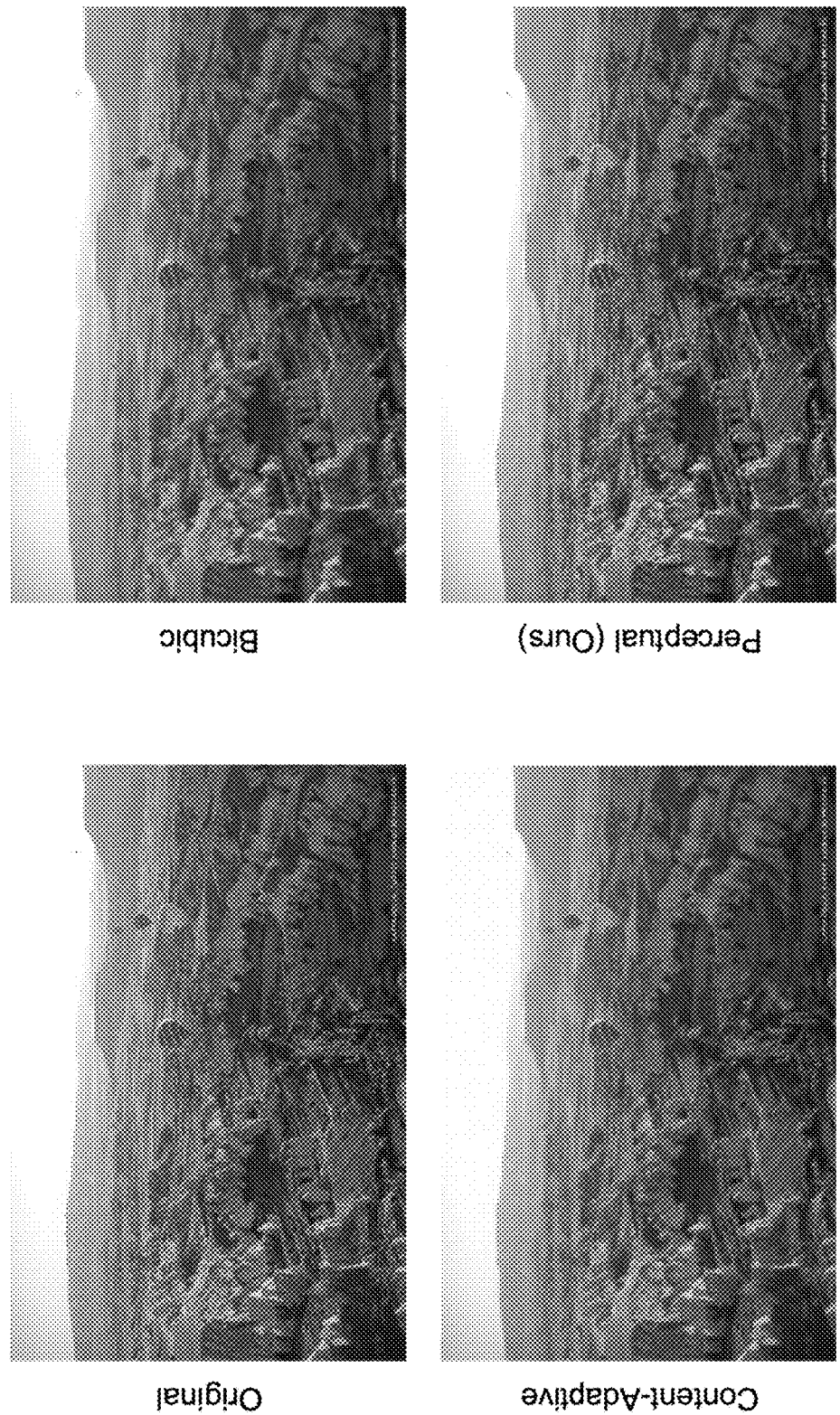
FIG. 15 illustrates results of downscaling.
Figure 16A:
FIG. 16 illustrates examples of images used for the user study.
Figure 16B:
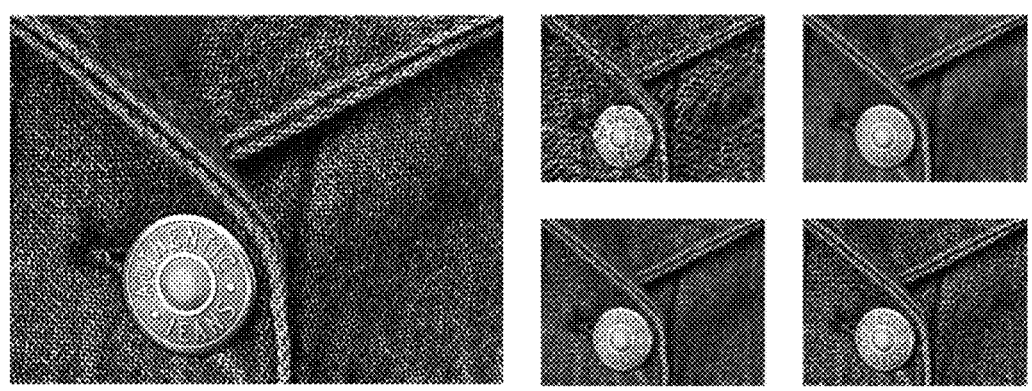

FIG. 15 illustrates that the process of downscaling described here is able to capture small-scale details and textures while preserving local contrast and luminance to produce a perceptually accurate downscaled image. FIG. 16 illustrates examples of images used for the user study. For each of FIGS. 16A and 16B, the original image is on the left, and the four smaller images on the right are subsampling (top-left), bicubic filtering (top-right), content-adaptive downscaling (bottom left), and our perceptual downscaling (bottom-right).

The mean SSIM(X,Y) computed over two images X and Y is a metric that measures the similarity between the two images. The higher the value of the mean SSIM, the more similar the two images are. Mean SSIM has been shown to correlate well with human perception, meaning that when mean SSIM(X,Y) is high, humans perceive X and Y as very similar images and when mean SSIM(X,Y) is low, humans perceive X and Y as dissimilar images. Mean SSIM has been used for some image processing tasks. It is in general computationally demanding to optimize for an image X, given an input image Y, by maximizing SSIM(X,Y). The function SSIM(X,Y) can be defined between two corresponding image patches, one from X, and the other from Y. This function can then be averaged over the images to get the mean SSIM(X,Y).

For downscaling, simpler metrics such as the least squares norm, i.e., $\|X-Y\|^2$, for some representation of the images, have been used to measure the difference between the images X and Y. A familiar example is the "bicubic filter", which generates a smooth downscaled image by removing the details in the original high resolution image. As explained herein, measuring the difference between the high resolution image H and the downscaled image D using SSIM can provide better results.

As an example, consider an input high resolution image, H, comprising 1000×1000 pixels and an output downscaled image, D, comprising 100×100 pixels. From D, an upscaled D, called X (1000×1000 pixels) is generated for use in calculating SSIM values. In X, each pixel of D is repeated in a 10×10 area in X This is illustrated in FIG. 3, top row, and FIG. 4. Then, for each patch pair (patch(H), patch(X)), with a patch from X and the corresponding patch from H, the image processor will attempt to maximize the value of SSIM(patch(H),patch(X)) by changing the pixel values in patch(X), with the constraint that each 10×10 area in X should have the same pixel value (which corresponds to a single pixel value in D).

Normally, this is a computationally demanding and complex optimization, but using the techniques presented herein, a closed-form solution can be derived in various ways, such as by matching the means and standard deviations, and maximizing the covariance, as illustrated in part by Equation 5. Equation 7 illustrates a solution. The image processor does this for all patches in the images X and H. The set of patches can be divided into sets $S_i$, with non-overlapping patches, as in FIG. 3, bottom row. Since a pixel in D only belongs to a single patch in $S_i$, its value can optimized only over the unique patch that it belongs to in $S_i$. This gives an optimum downscaled image D for this $S_i$. Finally, we average over all the resulting Ds optimized over different Ss to treat all patches equally. The result of this averaging, and hence the final value for a pixel is in Equation 8. If the patch sizes are kept as small as possible (e.g., 2×2 in D, and hence 2 s×2 s in H and X), details are preserved well.

Figure 17:
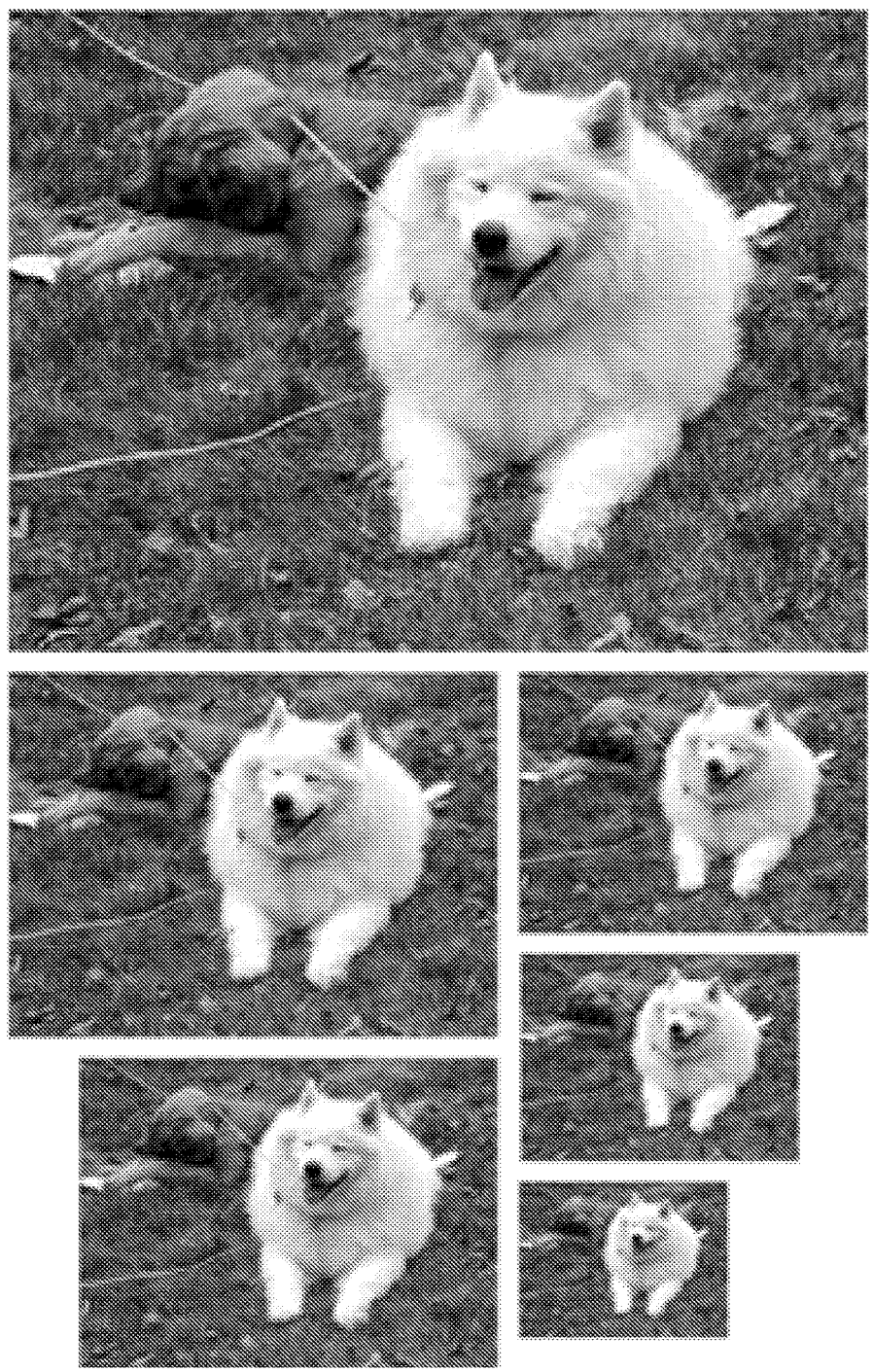
FIG. 17 examples of downscaling with adaptively adjusting local details.

FIG. 17 illustrates examples of our downscaling method adaptively adjusting local details such that downscaled images perceptually close to the original image are generated.

SSIM Based Optimization and Global Optimums

We parameterize the solution of the optimization problem by setting $\mu_x=\alpha\mu_h$, and $\sigma_x=\gamma\sigma_h$, for arbitrary ($\alpha,\gamma$). Then, to maximize SSIM(h,x) for this particular ($\alpha,\gamma$), maximize $\sigma_{xh}$. This leads to the following constrained optimization problem of Equation 9.

$$\max_d a^T d, m^T d = \alpha\mu_h, d^T M d = \alpha^2\mu_h^2 + \gamma^2\sigma_h^2 \qquad \text{(Equ. 9)}$$

This problem can be solved by standard methods, such as the method of Lagrange multipliers as we show below. The solution is given by Equation 10.

$$d_i^*(\alpha, \gamma) = \alpha\mu_h + \gamma\frac{\sigma_h}{\sigma_l}(l_i - \mu_h).$$ (Equ. 10)

For each $(\alpha,\gamma)$, the d* with the components $d_i^*$ thus maximizes the covariance $\sigma_{hx}$ and hence SSIM. If we plug in this expression for $d_i^*$ into the expression for SSIM in Equation 4, we get the following maximum SSIM.

$$SSIM(h, d^*(\alpha, \gamma)) = 4\frac{\sigma_l}{\sigma_h}\frac{\alpha\gamma}{(1+\alpha^2)(1+\gamma^2)}$$ (Equ. 11)

This expression is maximized if we select $\alpha=\gamma=1$, giving us the global optimum d*. Hence, the solution of the problem in Equation 9 with the choice $(\alpha,\gamma)=(1,1)$ coincides with the solution of the original problem in Equation 3.

For simplicity of the equations, we make the following definitions $e:=M^{1/2}d$, $b:=M^{-1/2}m$, $c^2:=\alpha^2\mu_h^2+\gamma^2\sigma_h^2$, $f:=M^{-1/2}a$. Then, the problem in Equation 5 above can be rewritten as in Equation 12.

$$\max_e f^Te, b^Te = \alpha\mu_h, \|e\|^2 = c^2$$ (Equ. 12)

We solve this problem with the method of Lagrange multipliers. Hence, we optimize the function of Equation 13.

$$F(e,\lambda_1,\lambda_2)=f^Te-\lambda_1(b^Te-\alpha\mu_h)-\lambda_2(\|e\|^2-c^2)$$ (Equ. 13)

Taking the derivatives with respect to e, $\lambda_1$, and $\lambda_2$ gives us Equations 14-16.

$$e = \frac{-f-\lambda_1 b}{2\lambda_2}$$ (Equ. 14)

$$-(\mu_h + \lambda_1) = 2\alpha\mu_h\lambda_2$$ (Equ. 15)

$$a^T 1 + 2\lambda_1\mu_h + \lambda_1^2 = 4c^2\lambda_2^2.$$ (Equ. 16)

Combining the last two equations, we can solve for $\lambda_1$ and $\lambda_2$ as in Equation 17.

$$\lambda_1 = \frac{-\mu_h \pm \alpha\mu_h\sqrt{a^T 1-\mu_h^2}}{\gamma\sigma_h}$$ (Equ. 17)

$$\lambda_2 = \mp\frac{1}{2}\frac{\sqrt{a^T 1-\mu_h^2}}{\gamma\sigma_h}.$$ (Equ. 18)

Substituting these into the expression for e gives us $$e = \frac{-f-\left(-\mu_h \pm \frac{\alpha\mu_h\sigma_l}{\gamma\sigma_h}\right)b}{\frac{\mp\sigma_l}{\gamma\sigma_h}}.$$ (Equ. 19)

Hence, we get the solution of Equation 20 where 1 denotes the vector of ones.

$$d = \alpha\mu_h 1 \pm \frac{\gamma\sigma_h}{\sigma_l}(1-\mu_h 1)$$ (Equ. 20)

In order to decide on the sign, maximize the covariance and hence $a^Td$. Substituting the expression for d, we can see that this dot product is maximized for the positive sign.

Pseudocode for Operations

In the algorithm below, implementable in hardware and/or software, operations are element-wise on the single channel images, denoted with big letters. The function convValid(X, P (y)) convolves image X with an averaging filter of size y by y for the valid range of the image such that the kernel stays within the image limits. The function convFull is similar but the image is assumed to be padded with zeros to allow the kernel go out of the image limits. The function subSample(X,y) sub samples image X at intervals of y, $I_X$ produces an image of the size of X with all ones, X(C) gets all entries of the image X for which the corresponding entry in the image C returns true, and £=$10^{-6}$. The inputs to the process are an input image H, a downscaling factors and a patch size $n_p$. The output is a downscaled image D. The steps are:

1: L←subSample(convValid(H,P(s)),s)
2: $L_2$←sub Sample(convValid($H^2$,P(s)),s)
3: M←convValid(L,P($\sqrt{n_p}$))
4: $S_l$←convValid($L^2$,P($\sqrt{n_p}$))−$M^2$
5: $S_h$←convValid($L_2$,P($\sqrt{n_p}$))−$M^2$
6: R←$\sqrt{S_h/S_l}$
7: ($S_l$<ε)←0
8: N←convFull($I_M$,P($\sqrt{n_p}$))
9: T←convFull(R×M,P($\sqrt{n_p}$))
10: M←convFull(M,P($\sqrt{n_p}$))
11: R←convFull(R,P($\sqrt{n_p}$))
12: D←(M+R×L−T)/N According to one embodiment, the techniques described herein are implemented by one or generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 18:
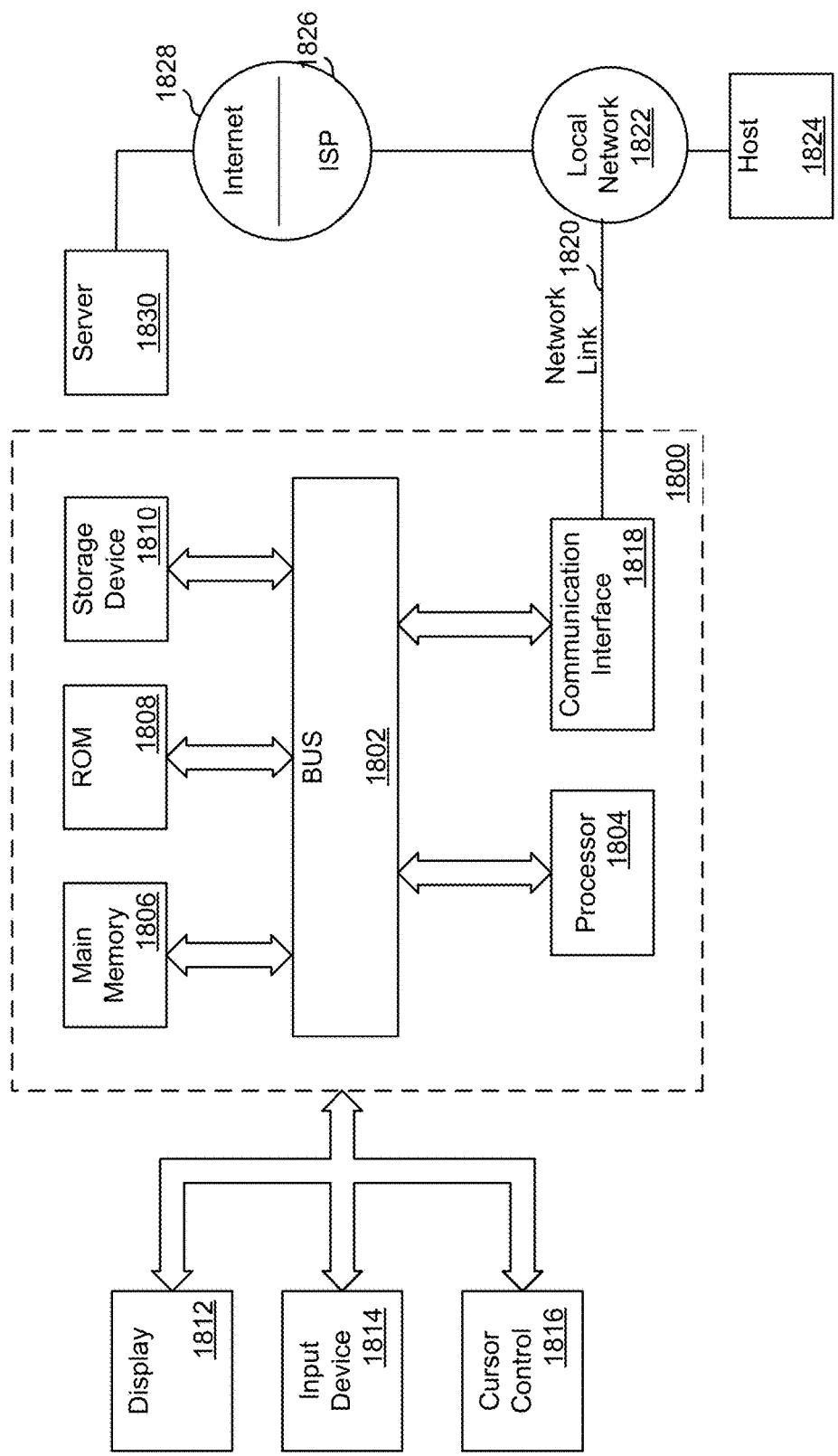
FIG. 18 is a block diagram that illustrates a computer system upon which an embodiment of the invention may be implemented.

For example, FIG. 18 is a block diagram that illustrates a computer system 1800 upon which an embodiment of the invention may be implemented. Computer system 1800 includes a bus 1802 or other communication mechanism for communicating information, and a processor 1804 coupled with bus 1802 for processing information. Processor 1804 may be, for example, a general purpose microprocessor.

Computer system 1800 also includes a main memory 1806, such as a random access memory (RAM) or other dynamic storage device, coupled to bus 1802 for storing information and instructions to be executed by processor 1804. Main memory 1806 also may be used for storing temporary variables or other intermediate information during execution of instructions to be executed by processor 1804. Such instructions, when stored in non-transitory storage media accessible to processor 1804, render computer system 1800 into a special-purpose machine that is customized to perform the operations specified in the instructions.

Computer system 1800 further includes a read only memory (ROM) 1808 or other static storage device coupled to bus 1802 for storing static information and instructions for processor 1804. A storage device 1810, such as a magnetic disk or optical disk, is provided and coupled to bus 1802 for storing information and instructions.

Computer system 1800 may be coupled via bus 1802 to a display 1812, such as a computer monitor, for displaying information to a computer user. An input device 1814, including alphanumeric and other keys, is coupled to bus 1802 for communicating information and command selections to processor 1804. Another type of user input device is cursor control 1816, such as a mouse, a trackball, or cursor direction keys for communicating direction information and command selections to processor 1804 and for controlling cursor movement on display 1812. This input device typically has two degrees of freedom in two axes, a first axis (e.g., x) and a second axis (e.g., y), that allows the device to specify positions in a plane.

Computer system 1800 may implement the techniques described herein using customized hard-wired logic, one or more ASICs or FPGAs, firmware and/or program logic which in combination with the computer system causes or programs computer system 1800 to be a special-purpose machine. According to one embodiment, the techniques herein are performed by computer system 1800 in response to processor 1804 executing one or more sequences of one or more instructions contained in main memory 1806. Such instructions may be read into main memory 1806 from another storage medium, such as storage device 1810. Execution of the sequences of instructions contained in main memory 1806 causes processor 1804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1810. Volatile media includes dynamic memory, such as main memory 1806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1802. Transmission media can also take the form of acoustic or light waves, such as those generated during radio-wave and infra-red data communications.

Various forms of media may be involved in carrying one or more sequences of one or more instructions to processor 1804 for execution. For example, the instructions may initially be carried on a magnetic disk or solid state drive of a remote computer. The remote computer can load the instructions into its dynamic memory and send the instructions over a network connection. A modem or network interface local to computer system 1800 can receive the data. Bus 1802 carries the data to main memory 1806, from which processor 1804 retrieves and executes the instructions. The instructions received by main memory 1806 may optionally be stored on storage device 1810 either before or after execution by processor 1804.

Computer system 1800 also includes a communication interface 1818 coupled to bus 1802. Communication interface 1818 provides a two-way data communication coupling to a network link 1820 that is connected to a local network 1822. For example, communication interface 1818 may be an integrated services digital network (ISDN) card, cable modem, satellite modem, or a modem to provide a data communication connection to a corresponding type of telephone line. Wireless links may also be implemented. In any such implementation, communication interface 1818 sends and receives electrical, electromagnetic or optical signals that carry digital data streams representing various types of information.

Network link 1820 typically provides data communication through one or more networks to other data devices. For example, network link 1820 may provide a connection through local network 1822 to a host computer 1824 or to data equipment operated by an Internet Service Provider (ISP) 1826. ISP 1826 in turn provides data communication services through the world wide packet data communication network now commonly referred to as the "Internet" 1828. Local network 1822 and Internet 1828 both use electrical, electromagnetic or optical signals that carry digital data streams. The signals through the various networks and the signals on network link 1820 and through communication interface 1818, which carry the digital data to and from computer system 1800, are example forms of transmission media.

Computer system 1800 can send messages and receive data, including program code, through the network(s), network link 1820 and communication interface 1818. In the Internet example, a server 1830 might transmit a requested code for an application program through Internet 1828, ISP 1826, local network 1822 and communication interface 1818. The received code may be executed by processor 1804 as it is received, and/or stored in storage device 1810, or other non-volatile storage for later execution.

Figure 19:
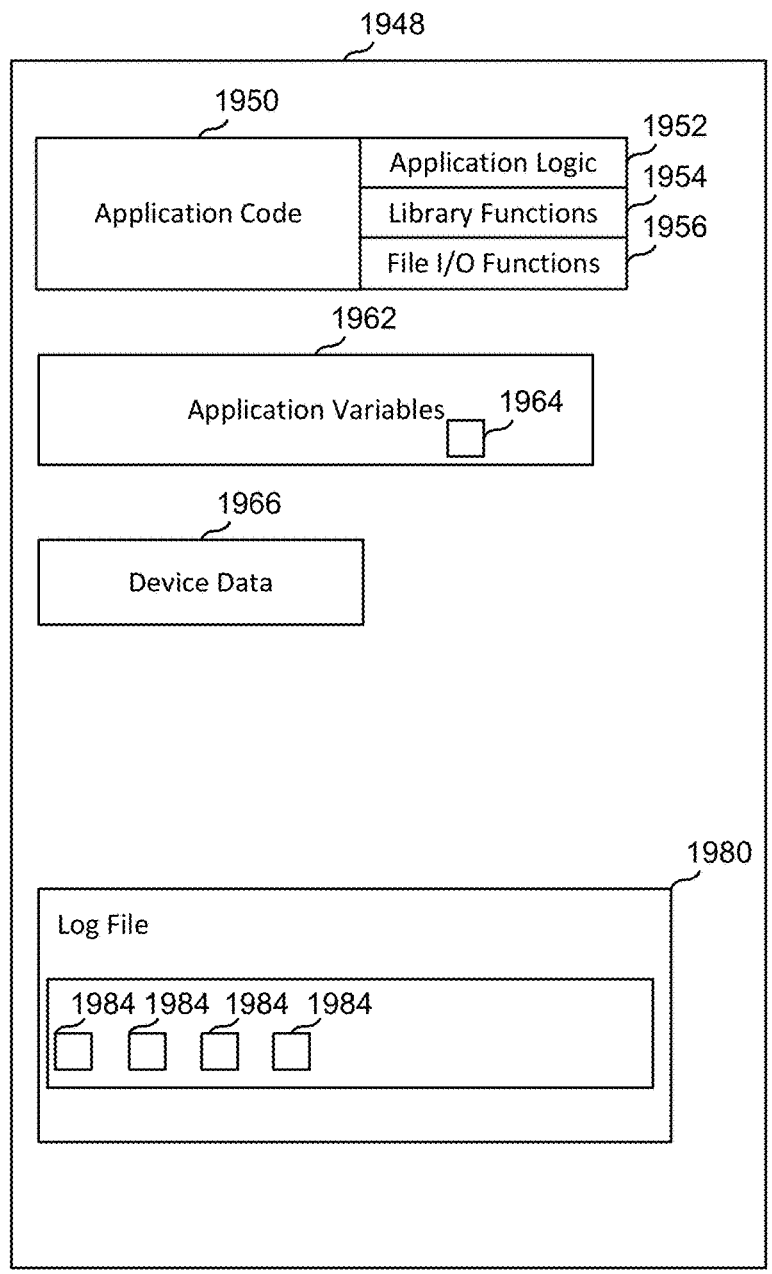
FIG. 19 is a simplified functional block diagram of a storage device having an application that can be accessed and executed by a processor in a computer system with which an embodiment of the invention may be implemented.

FIG. 19 is a simplified functional block diagram of a storage device 1948 having an application that can be accessed and executed by a processor in a computer system. The application can one or more of the applications described herein, running on servers, clients or other platforms or devices. Storage device 1948 can be one or more memory devices that can be accessed by a processor and storage device 1948 can have stored thereon application code 1950 that can be configured to store one or more processor readable instructions. The application code 1950 can include application logic 1952, library functions 1954, and file I/O functions 1956 associated with the application.

Storage device 1948 can also include application variables 1962 that can include one or more storage locations configured to receive input variables 1964. The application variables 1962 can include variables that are generated by the application or otherwise local to the application. The application variables 1962 can be generated, for example, from data retrieved from an external source, such as a user or an external device or application. The processor can execute the application code 1950 to generate the application variables 1962 provided to storage device 1948.

One or more memory locations can be configured to store device data 1966. Device data 1966 can include data that is sourced by an external source, such as a user or an external device. Device data 1966 can include, for example, records being passed between servers prior to being transmitted or after being received.

Storage device 1948 can also include a log file 1980 having one or more storage locations 1984 configured to store results of the application or inputs provided to the application. For example, the log file 1980 can be configured to store a history of actions.

Figure 20:
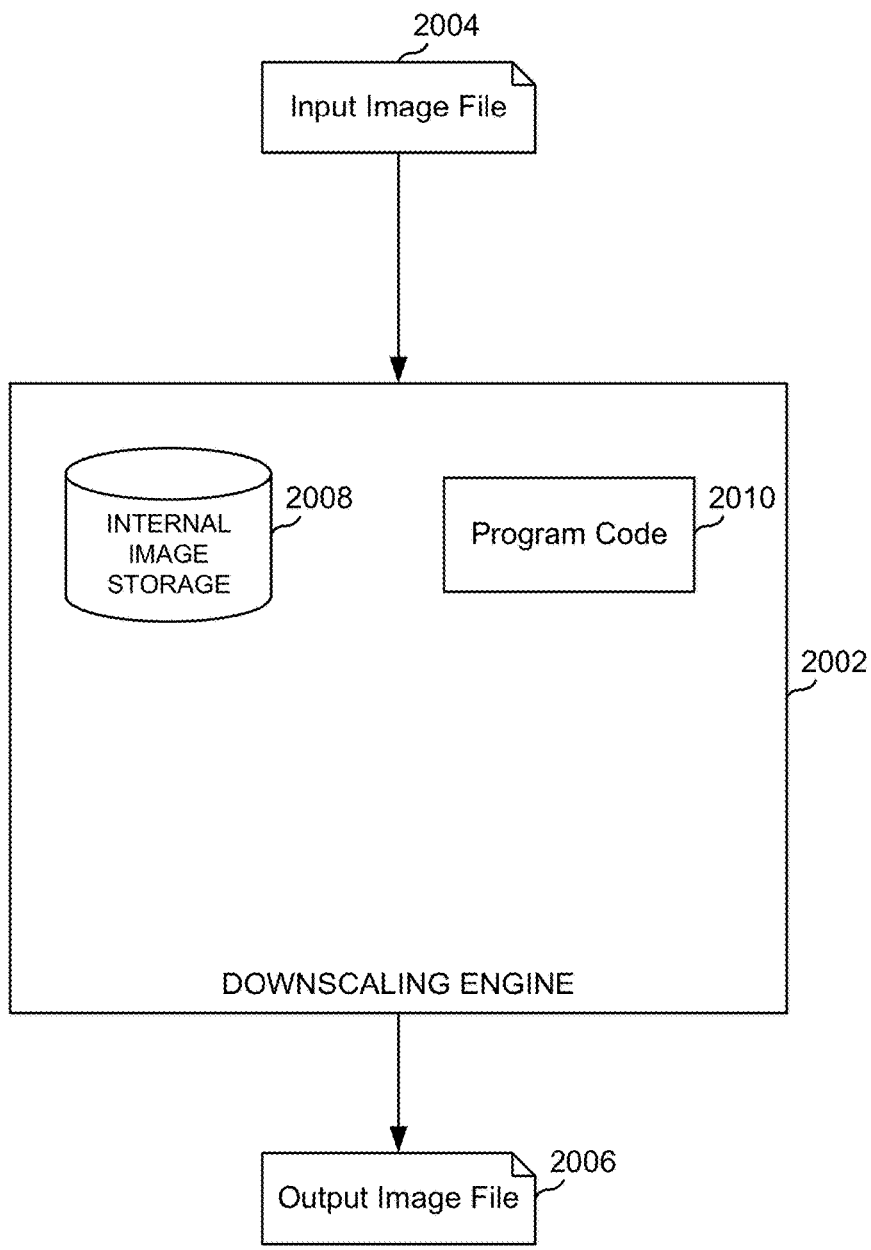
FIG. 20 illustrates an example of a downscaling engine that takes in an input image file and outputs an output image file using processes described herein.

FIG. 20 illustrates an example of a downscaling engine 2002 that takes in an input image file 2004 and outputs an output image file 2006 using the processes described herein. Internal image storage 2008 is used to hold image data while being processed and program code 2010 represents program instructions to perform the downscaling described herein.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, 13}, {A, C}, {B, C}, {A, B, C}. Thus, such conjunctive language is not generally intended to imply that certain embodiments require at least one of A, at least one of B and at least one of C each to be present.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A method, using a computer-implemented image processing engine, of downscaling images stored in electronically readable media, the method comprising:
   receiving a first image defined by a first set of pixels establishing a first image size at a first resolution, wherein the first image is represented in a computer-readable media;
   generating a second image defined by a second set of pixels establishing a second image size at a second resolution by downscaling the first image to form the second image, wherein the second image is represented in the computer-readable media and wherein values of the second set of pixels are defined by a function of the first set of pixels and wherein the second image size is smaller than the first image size;
   upscaling the second image to a third image, wherein the third image is represented in the computer-readable media and wherein the third image is defined by a third set of pixels derived from the second set of pixels establishing a third image size same as the first image size with a third resolution;
   associating individual pixels in the second image with a corresponding group of pixels from the third set of pixels;
   sampling a first image area of the first image, having a first image area size, at a first location of the first set of pixels to generate a first image sample, the first location of the first set of pixels comprising a patch of the first image smaller than the first image size;
   sampling a second image area of the third set of pixels corresponding to the first location of the first image area and the first image area size to generate a second image sample, the second image sample being a sample of the third image comprising patches, wherein pixels of each patch of the patches can be optimized, by the computer-implemented image processing engine independently of pixels of other patches;
   measuring a similarity between the first image area of the first image and the second image area of the third set of pixels by processing the first image sample and the second image sample to generate a perceptual image value;
   recursively adjusting values of third set of pixels until the image perception value matches a perceptual standard value within a pre-defined threshold;
   adjusting individual pixel values in the second image to a representative pixel value of each of the corresponding group of pixels; and
   storing the individual pixel values as the second image in the computer-readable media.

2. The method of claim 1, implemented using a computer system that has inputs for receiving an electronically-readable representation of the first image and outputs for outputting an electronically-readable representation of the second image, and a processor with program instructions stored in memory for processing image data according to the method.

3. The method of claim 1, wherein sampling of the second image area comprises sampling nonoverlapping patches and wherein sampling of the second image area uses a structural similarity index computed by multiplying components corresponding to luminance, contrast, and covariance.

4. The method of claim 3, wherein adjusting individual pixel values in the second image comprises:
- computing a parameterized solution by fixing a mean and a variance to arbitrary fixed values;
- optimizing the structural similarity index using the arbitrary fixed values to identify an optimized index value; and
- computing the optimized index value for different means and variances to identify a global optimum index value.

* * * * *